(12) United States Patent
Noghani et al.

(10) Patent No.: US 12,407,271 B2
(45) Date of Patent: Sep. 2, 2025

(54) MULTILEVEL POWER CONVERTER

(71) Applicant: ECOLE DE TECHNOLOGIE SUPERIEURE, Montreal (CA)

(72) Inventors: Kiavash Askari Noghani, Ottawa (CA); Kamal Al-Haddad, Montréal (CA)

(73) Assignee: ECOLE DE TECHNOLOGIE SUPERIEURE, Montreal (CA)

( * ) Notice: Subject to any disclaimer, the term of this patent is extended or adjusted under 35 U.S.C. 154(b) by 200 days.

(21) Appl. No.: 17/927,597

(22) PCT Filed: May 25, 2021

(86) PCT No.: PCT/CA2021/050701
§ 371 (c)(1),
(2) Date: Nov. 23, 2022

(87) PCT Pub. No.: WO2021/237343
PCT Pub. Date: Dec. 2, 2021

(65) Prior Publication Data
US 2023/0208314 A1    Jun. 29, 2023

Related U.S. Application Data

(60) Provisional application No. 63/029,516, filed on May 24, 2020.

(51) Int. Cl.
*H02M 7/483* (2007.01)
*H02M 1/00* (2006.01)
*H02M 1/12* (2006.01)

(52) U.S. Cl.
CPC ....... *H02M 7/4835* (2021.05); *H02M 1/0025* (2021.05); *H02M 1/12* (2013.01)

(58) Field of Classification Search
CPC .. H02M 7/483; H02M 7/4835; H02M 7/4837; H02M 1/0025; H02M 1/12
(Continued)

(56) References Cited

U.S. PATENT DOCUMENTS 8,817,504 B2    8/2014  Zhang et al.
9,923,484 B2 *  3/2018  Vahedi ............... H02M 7/537
(Continued)

OTHER PUBLICATIONS

Babaei E, Hosseini SH. New cascaded multilevel inverter topology with minimum number of switches. Energy Conversion and Management. Nov. 1, 2009; 50( 11):2761-7. * Abstract; Fig. 1.
(Continued)

*Primary Examiner* — Yemane Mehari
(74) *Attorney, Agent, or Firm* — NORTON ROSE FULBRIGHT CANADA LLP

(57) ABSTRACT

A multilevel power converter is provided. A first cell comprises a first switch and a second switch connectable to a load via a first terminal and connected in series on opposite poles of a DC source. A second cell comprises a third switch and a fourth switch connectable to the load via a second terminal and connected in series on opposite poles of a DC capacitor. An intermediate cell connects the first and second cells and comprises a fifth switch connected to positive poles of the source and the capacitor, a sixth switch connected to negative poles of the source and the capacitor, a seventh switch connected to the positive pole of the source and to the negative pole of the capacitor, and an eighth switch connected to the negative pole of the source and to the positive pole of the capacitor.

18 Claims, 53 Drawing Sheets

(58) Field of Classification Search
USPC .......................................................... 363/132
See application file for complete search history.

(56) References Cited

U.S. PATENT DOCUMENTS

2005/0127853 A1* 6/2005 Su ..................... H02M 7/4837
318/108
2013/0270917 A1* 10/2013 Yatsu .................... H02M 7/483
307/77

OTHER PUBLICATIONS

Liu J, Lin W, Wu J, Zeng J. A novel nine-level quadruple boost inverter with inductive-load ability. IEEE Transactions on Power Electronics. Oct. 1, 2018;34(5):4014-8. * whole document.

Noghani KA, Sharifzadeh M, Ounejjar Y, Al-Haddad K. Current based model predictive control for DC capacitor optimization in grid-connected and stand-alone nine-level packed u-cell inverter. In2019 IEEE 28th International Symposium on Industrial Electronics(ISIE) Jun. 12, 2019 (pp. 787-792). IEEE.* abstract; section III and B; Figs. 1 and 4; Equation 7 and 12; Table II.

Cortes P, Rodriguez J, Antoniewicz P, Kazmierkowski M. Direct power control of an AFE using predictive control. IEEE Transactions on Power Electronics. Nov. 25, 2008;23(5):2516-23. * abstract; Figs. 1, 2.

Vazquez S, Rodriguez J, Rivera M, Franquelo LG, Norambuena M. Model predictive control for power converters and drives: Advances and trends. IEEE Transactions on Industrial Electronics. Nov. 3, 2016;64(2):935-47. * abstract; section II, Fig. 1.

Cortes P, Rodriguez J, Vazquez S, Franquelo LG. Predictive control of a three-phase UPS inverter using two steps prediction horizon. In2010 IEEE International Conference on Industrial Technology Mar. 14, 2010 (pp. 1283-1288). IEEE. * abstract; section I.

* cited by examiner

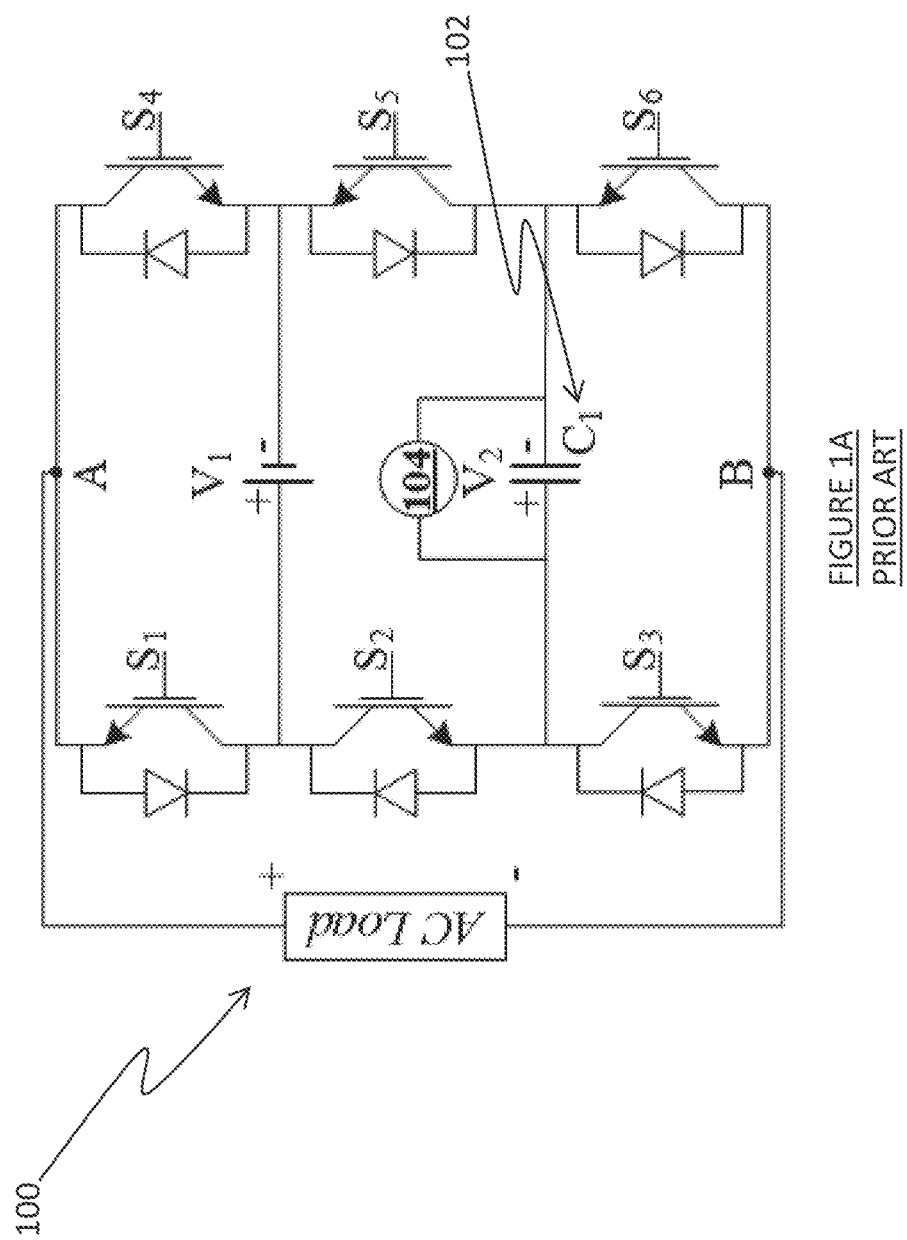

Table I Switching states of Figure 1D

| States | $S_1$ | $S_2$ | $S_3$ | $S_4$ | $S_5$ | $S_6$ | $S_7$ | $S_8$ | Output Voltage | C |
|---|---|---|---|---|---|---|---|---|---|---|
| 1 | 1 | 0 | 0 | 0 | 0 | 0 | 1 | 0 | $V_1 + V_2 = \frac{4}{3} \times V_{dc}$ | ↑ |
| 2 | 1 | 0 | 0 | 0 | 1 | 0 | 0 | 0 | $V_1 = V_{dc}$ | — |
| 3 | 1 | 0 | 1 | 0 | 0 | 0 | 1 | 0 | $V_1 = V_{dc}$ | ↑ |
| 4 | 1 | 0 | 0 | 1 | 0 | 0 | 1 | 0 | $V_1 - V_2 = \frac{2}{3} \times V_{dc}$ | ↑ |
| 5 | 0 | 0 | 1 | 0 | 0 | 0 | 1 | 0 | $V_2 = \frac{1}{3} \times V_{dc}$ | ↑ |
| 6 | 1 | 1 | 0 | 1 | 0 | 1 | 0 | 0 | $V_2 = \frac{1}{3} \times V_{dc}$ | — |
| 7 | 0 | 0 | 1 | 1 | 0 | 0 | 1 | 0 | 0 | — |
| 8 | 1 | 1 | 0 | 0 | 1 | 1 | 0 | 0 | 0 | — |
| 9 | 0 | 0 | 0 | 1 | 0 | 0 | 1 | 1 | 0 | ↑ |
| 10 | 1 | 0 | 1 | 1 | 0 | 0 | 0 | 0 | $-V_2 = \frac{-1}{3} \times V_{dc}$ | — |
| 11 | 0 | 1 | 0 | 1 | 0 | 1 | 0 | 1 | $-V_2 = \frac{-1}{3} \times V_{dc}$ | ↑ |
| 12 | 1 | 0 | 0 | 1 | 1 | 0 | 0 | 0 | $V_2 - V_1 = \frac{-2}{3} \times V_{dc}$ | — |
| 13 | 0 | 1 | 1 | 0 | 0 | 1 | 0 | 1 | $-V_1 = -V_{dc}$ | — |
| 14 | 0 | 1 | 0 | 1 | 1 | 0 | 0 | 1 | $-V_1 = -V_{dc}$ | — |
| 15 | 0 | 1 | 0 | 1 | 0 | 0 | 0 | 1 | $-V_1 = -V_{dc}$ | — |
| 16 | 0 | 1 | 1 | 1 | 0 | 0 | 0 | 1 | $-V_1 - V_2 = \frac{-4}{3} \times V_{dc}$ | — |

FIGURE 2A

Table II Voltages values of different multilevel converters of the proposed topology

| ($N_C$) | ($N_{PSU}$) | ($N_{PSX}$) | ($N_{VLU}$) | ($N_{VLX}$) | $V_1$ | $V_2$ | $V_3$ | ... | $V_{(n-1)}$ | $V_n$ |
|---|---|---|---|---|---|---|---|---|---|---|
| 0 | - | - | 1 | - | - | - | - | ... | - | - |
| 1 | 4 | - | 3 | - | $V_{dc}$ | - | - | ... | - | - |
| 2 | 6 | 8 | 7 | 9 | $V_{dc}$ | $\dfrac{V_{dc}}{3}$ | - | ... | - | - |
| 3 | 8 | 12 | 15 | 23 | $V_{dc}$ | $\dfrac{3V_{dc}}{7}$ | $\dfrac{V_{dc}}{7}$ | ... | - | - |
| 4 | 10 | 16 | 31 | 53 | $V_{dc}$ | $\dfrac{7V_{dc}}{15}$ | $\dfrac{3V_{dc}}{15}$ | ... | - | - |
| 5 | 12 | 20 | 63 | 115 | $V_{dc}$ | $\dfrac{15V_{dc}}{31}$ | $\dfrac{7V_{dc}}{31}$ | ... | - | - |
| ... | ... | ... | ... | ... | ... | ... | ... | ... | ... | ... |
| $N_{C(n-1)}$ | $N_{PSU(n-1)}$ | $N_{PSX(n-1)}$ | $N_{VLU(n-1)}$ | $N_{VLX(n-1)}$ | $V_{dc}$ | $\dfrac{N_{VLU(n-3)}}{N_{VLU(n-2)}}$ | $\dfrac{N_{VLU(n-4)}}{N_{VLU(n-2)}}$ | ... | $\dfrac{3 \times V_{dc}}{N_{VLU(n-2)}}$ | $\dfrac{V_{dc}}{N_{VLU(n-2)}}$ |
| $N_{C(n-1)}+1$ | $N_{PSU(n-1)}+2$ | $N_{PSX(n-1)}+4$ | $2 \times N_{VLU(n-1)}+1$ | $N_{VLX(n-1)} + 2^{N_{C(n-1)}+2} - 2$ | $V_{dc}$ | $\dfrac{N_{VLU(n-2)}}{N_{VLU(n-1)}}$ | $\dfrac{N_{VLU(n-3)}}{N_{VLU(n-1)}}$ | ... | $\dfrac{3 \times V_{dc}}{N_{VLU(n-1)}}$ | $\dfrac{V_{dc}}{N_{VLU(n-1)}}$ |

FIGURE 6

Table III Comparison between other nine-level inverter topologies and UX-Cell9

|  | NPC | FC | Classic CHB | Hybrid CHB | PUC9 | PEC9 | K K Gupta | UX-Cell9 |
|---|---|---|---|---|---|---|---|---|
| No. Of Capacitors | 8 | 8 | 3 | 2 | 2 | 2 | 0 | 1 |
| No. Of Diodes | 14 | 0 | 0 | 0 | 0 | 0 | 0 | 2 |
| No. Of Switches | 16 | 16 | 16 | 12 | 8 | 8 | 10 | 8 |
| No. Of DC sources | 1 | 1 | 1 | 1 | 1 | 1 | 2 | 1 |
| Boosting | 0% | 0% | 0% | 0% | 0% | 0% | 33% | 33% |

| Table IV System Parameters | |
|---|---|
| Parameters | Value |
| Sampling Time | 20 μs |
| DC Voltage Source | 150V & 195V |
| Capacitor(C) | 3000 μF |
| Line inductance | 2.5 mH |
| Line resistance | 0.1 Ω |
| AC Grid voltage | 120V RMS |
| Reference Current | 4A & 8A |

Figure 10

Table V System Parameters

| Parameters | Value |
|---|---|
| Sampling Time | 46 μs |
| DC Voltage Source | 100V & 120V |
| Capacitor(C) | 560 μF |
| Line inductance | 2.5 mH |
| Line resistance | 0.1 Ω |
| AC Grid voltage | 60V RMS |
| Reference Current | 2A & 1A |

FIGURE 15

Table VII simulation parameters for Grid-Connected and Stand-alone Modes

| Parameters | Value |
|---|---|
| Grid Voltage($V_L$) | 120 V (rms) |
| Grid Frequency | 60 Hz |
| Grid Link Inductor ($L_f$) in grid-connected mode | 2.5 mH |
| Grid Link Inductor ($L_f$) in stand-alone mode | 20 mH |
| DC Source Voltage ($V_L$) | 145-175 V |
| Line resistance ($R_f$) in grid connected mode | 0.1 Ω |
| Line resistance ($R_f$) in stand-alone mode | 40-80 Ω |
| Reference Current | 2A & 4A |
| Sampling Time | 20 μs |
| DC Capacitors | 3000 μF |

Figure 25

MULTILEVEL POWER CONVERTER

CROSS-REFERENCE TO RELATED APPLICATIONS

This patent application is a US National Stage of International Application No. PCT/CA2021/050701, filed on Apr. 7, 2021, which claims priority of U.S. provisional Application Ser. No. 63/029,516, filed on May 24, 2020, the entire contents of which are hereby incorporated by reference.

TECHNICAL FIELD

The present disclosure relates to the field of power electronic converters, and more particularly, to multilevel power source inverters and rectifiers.

BACKGROUND

An inverter is an electrical circuit that converts direct current (DC) to alternating current (AC). Inverters are used in a wide range of applications, from small switching power supplies in computers, to large electric utility applications that transport bulk power. A rectifier is an electrical circuit used to convert AC into DC current. The output of the rectifier is essentially a half-AC current, which is then filtered into DC. For the purpose of the present specification, inverters and rectifiers are referred to as converters when both devices are being referred to.

Converters are known to cause harmonics in their environments, such as within the supply network or in sensitive equipment connected to the same line. To limit the harmonics that can be induced into a system, various norms have been established, such as the IEC 1000 Mar. 2 and the EN61000-3-2 standards. In order to meet these standards, two techniques are known to reduce harmonics. The first technique is to apply filters that block the harmonics. This solution is costly and cumbersome. The second technique is the use of multilevel converters.

Multilevel converters reduce harmonics by providing an AC waveform that exhibits multiple steps at several voltage levels. The closer the waveform comes to a perfect sine wave, the less likely it is that harmonics be present. Known topologies for multilevel converters are the Neutral Point Diode Clamped Multilevel Converters, the Flying Capacitor Multilevel Converters, and the Cascaded H-Bridge Multilevel Converters. While all three of these topologies are successful in reducing harmonics, they quickly become bulky and constricting when the number of levels exceeds three, due to the large number of both active and passive components present in the circuits.

Growing concerns about the emission of greenhouse gases prompted countries to invest more in renewable energy sources such as solar, wind, and hydroelectric power, etc. In order to inject the generated electricity from solar panels, and new generation of wind and hydro turbines, inverters are required; however, conventional inverters, which are normally two-level or three-level inverters, generate and inject negative harmonics into the electric grid.

These adverse harmonics have negative effects on voltage and current of distributed networks and electric machines or devices.

Some have developed multilevel converters adapted to provide more than two or three voltage levels. For instance, described in US Granted U.S. Pat. No. 9,331,599, there is a multilevel electric power converter that provides five or seven voltage levels. The multilevel electric power converter has six switches and two DC sources or six switches, one DC source and one passive source such as a capacitor, as shown in prior art FIG. 1A.

However, in order to provide an even greater number of voltage levels, a greater number of switches and DC sources are required. For instance, described in US Granted U.S. Pat. No. 9,923,484, there is a multilevel electric power converter that provides nine voltage levels. The multilevel electric power converter has eight switches, one DC source and two capacitors, as shown in prior art FIG. 1B.

Nevertheless, a multilevel voltage source inverter (VSI) has been previously described to maximize the number of levels in the output waveform. Prior art FIGS. 1C, 1D, and 1E present the nine level circuit of this topology, prior art FIGS. 1F, 1G, and 1H illustrate the twenty three level of this topology and prior art FIGS. 1I, 1J, and 1K indicate the generalized circuit of this topology. As can be seen from these mentioned figures, this topology needs ten power switches and two dc-sources or eight switches, eight diodes, and two dc-sources to generate nine output levels; for generating twenty-three output levels, it needs sixteen power switches and three dc-sources or twelve power switches, sixteen diodes, and three dc-sources.

There is however still a need to reduce the number of circuit elements in a power converter circuitry while providing an acceptable number of voltage levels in order to reduce manufacturing cost and simplify the control of such converters.

SUMMARY

In accordance with one aspect, there is provided a multilevel power converter for transforming electrical power between direct current (DC) power and alternating current (AC) power, comprising a first cell comprising a first switch, a second switch, and a DC source, the first switch and the second switch connectable to a load via a first terminal and connected in series with the source on opposite poles thereof, a second cell comprising a third switch and a fourth switch, the third switch and the fourth switch connectable to the load via a second terminal and connected in series with a DC capacitor on opposite poles thereof, and at least one intermediate cell connecting the first cell to the second cell, the at least one intermediate cell comprising a fifth switch connected to a positive pole of the source and to a positive pole of the capacitor, a sixth switch connected to a negative pole of the source and to a negative pole of the capacitor, a seventh switch connected to the positive pole of the source and to the negative pole of the capacitor, and an eighth switch connected to the negative pole of the source and to the positive pole of the capacitor.

In some embodiments, the power converter is operated as an inverter and is configured for producing an AC output at the first and second terminals.

In some embodiments, the at least one intermediate cell comprises a single intermediate cell.

In some embodiments, the AC output has nine voltage levels.

In some embodiments, the power converter further comprises an additional cell connecting the intermediate cell to the second cell, the third switch and the fourth switch of the second cell connected in series with an additional DC capacitor on opposite poles thereof, the additional cell comprising a first additional switch connected to the positive pole of the capacitor and to a positive pole of the additional capacitor, and a second additional switch connected to the negative pole of the capacitor and to a negative pole of the additional capacitor.

In some embodiments, the AC output has twenty-one voltage levels.

In some embodiments, the at least one intermediate cell comprises a plurality of interconnected intermediate cells.

In some embodiments, the AC output has $$\left[2 \times \sum_{m=1}^{\frac{N_{PSX}}{4}} (2^m - 1)\right] + 1$$

voltage levels, where $N_{PSX}$ is a total number of switches in the first cell, the second cell, and the plurality of intermediate cells.

In some embodiments, each of the first, second, third, fourth, seventh, and eighth switches is a unipolar switching device with bi-directional current flow capability.

In some embodiments, each of the fifth and sixth switches is a bipolar switching device with unidirectional current flow capability.

In some embodiments, each of the fifth and sixth switches comprises a unipolar switching device connected in series with a diode and having unidirectional current flow capability.

In some embodiments, the switches are operated with at least one redundant switching state to produce the AC output.

In accordance with another aspect, there is provided a method for controlling a multilevel power converter connected to a load, the power converter comprising a DC source, at least one DC capacitor, and a plurality of switches connected to the source and the capacitor, the method comprising measuring a load current and a load voltage across the load, a source voltage across the source, and a capacitor voltage across the at least one capacitor, determining possible switching states for the plurality of switches, computing, for the possible switching states, a cost function based on the load current, the load voltage, the source voltage, and the capacitor voltage, selecting a given one of the switching states having a lowest cost function, and applying the given switching state to the power converter.

In some embodiments, determining the possible switching states comprises applying a model predictive control technique.

In some embodiments, the method further comprises computing a predicted load current for the load and a predicted capacitor voltage for the at least one capacitor, the cost function being computed based on the predicted load current and the predicted capacitor voltage.

In some embodiments, applying the given switching state to the power converter comprises generating at least one control signal for the plurality of switches in accordance with the given switching state, and issuing the at least one control signal to the plurality of switches.

In accordance with another aspect, there is provided a controller for controlling a multilevel power converter connected to a load, the power converter comprising a DC source, at least one DC capacitor, and a plurality of switches connected to the source and the capacitor, the controller comprising a measuring unit configured to measure a load current and a load voltage across the load, a source voltage across the source, and a capacitor voltage across the at least one capacitor, a switching state determination unit configured to determine possible switching states for the plurality of switches, a cost function computation unit configured to compute, for the possible switching states, a cost function based on the load current, the load voltage, the source voltage, and the capacitor voltage, and to select a given one of the switching states having a lowest cost function, and a control signal output unit configured to output, to the plurality of switches, a plurality of control signals in accordance with the given switching state.

In some embodiments, the cost function computation unit is configured to compute a predicted load current for the load and a predicted capacitor voltage for the at least one capacitor, and to compute the cost function based on the predicted load current and the predicted capacitor voltage.

Features of the systems, devices, and methods described herein may be used in various combinations, in accordance with the embodiments described herein.

BRIEF DESCRIPTION OF THE DRAWINGS

Further features and advantages of the present invention will become apparent from the following detailed description, taken in combination with the appended drawings, in which:

FIG. 1A shows a prior art five-level converter circuit.

FIG. 2A presents switching states of the power converter (also referred to as a UX-Cell multi-level inverter—MLI— or converter) of FIG. 3, with associated voltage levels produced at the load and associated capacitor states, according to one embodiment;

FIG. 6 depicts a table presenting values of produced voltage levels according to the number of capacitors and DC sources in an extendable UX-CELL MLI or converter circuit of FIG. 5C, according to one embodiment;

FIG. 10 depicts a table presenting the system parameters used for simulation of the UX-Cell MLI of FIG. 3 in a grid-connected mode of operation, according to one embodiment;

FIG. 15 depicts a table presenting system parameters used for obtaining the experimental results of the UX-CELL MLI of FIG. 3 in grid connected mode of operation, according to one embodiment;

FIG. 25 depicts a table presenting the system parameters used for simulation of the UXU-Cell MLI or converter of FIG. 22 in grid-connected mode, according to one embodiment.

It will be noted that throughout the appended drawings, like features are identified by like reference numerals.

DETAILED DESCRIPTION

A single-phase single-DC-source nine-level inverter (referred to herein as a UX-Cell inverter) is herein described. In addition, a control approach for controlling load current and voltage balancing of the inverter capacitors is proposed based on a Model Predictive Control (MPC) technique.

As will be discussed further below, in one embodiment, the UX-CELL multilevel inverter (MLI) proposed herein may be expandable with a limited number of devices or switching devices, while the proposed MLI generates an interesting number of output voltage levels. Additionally, in one embodiment, the proposed MLI is capable of providing a boost operation. Moreover, in one embodiment, the boosting function of the proposed MLI topology does not require additional reactive components or a transformer. In MLIs that are not single-dc-source, the DC sources must be isolated by using transformers. However, the inverter topology proposed herein does not need transformers to isolate the DC bus voltages. In one embodiment, in the present UX-Cell MLI, the DC source and capacitor can be interconnected and consequently regulated to desired values, thus there alleviating the need for transformers.

Figure 3:
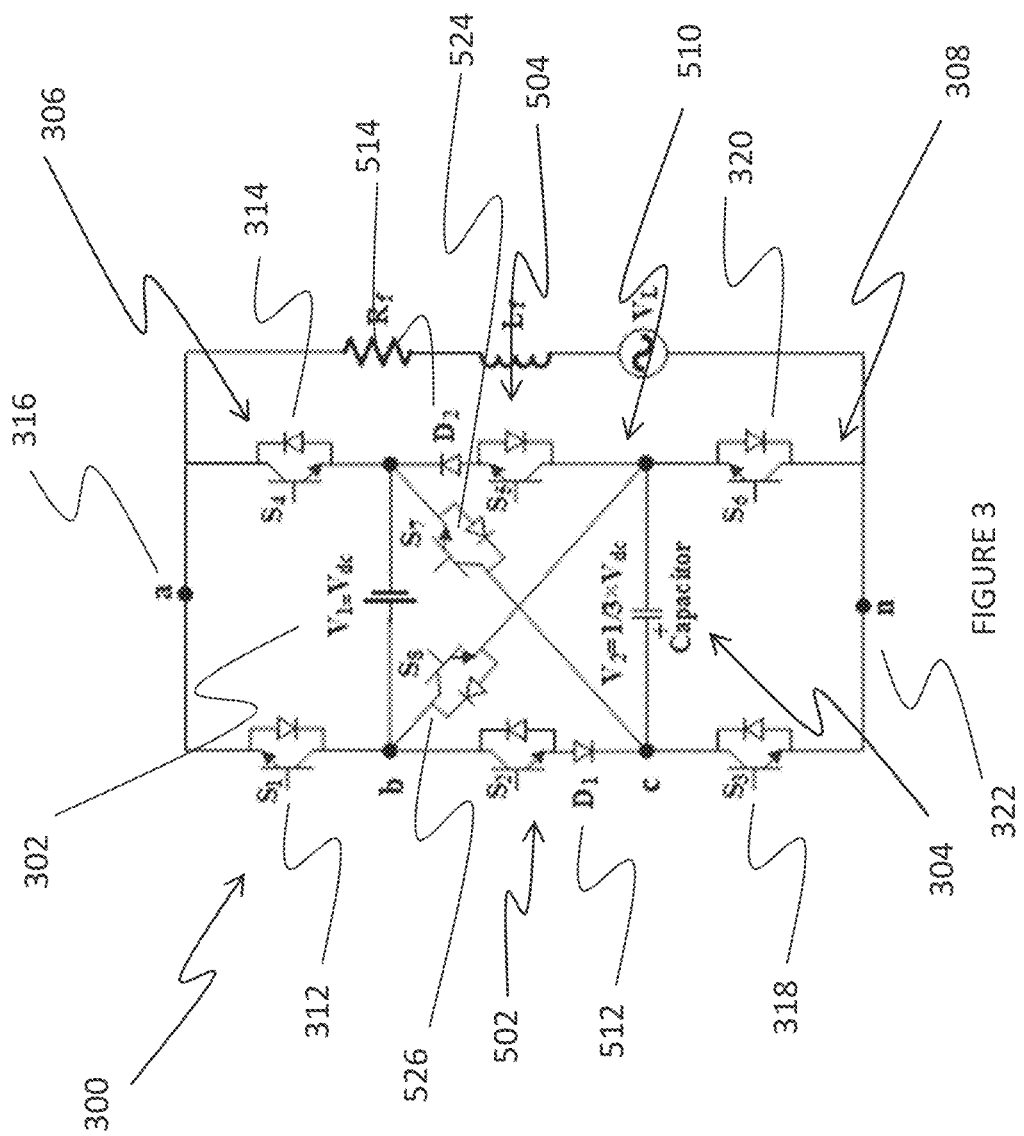
FIG. 3 presents a UX-CELL MLI having unipolar devices and bipolar devices with unidirectional current flow capability, according to one embodiment.

According to one embodiment of the solution, there is presented in FIG. 3 a UX-CELL Multilevel Inverter (MLI) 300 or converter circuit that is connected to a load. The UX-CELL MLI 300 has a single DC source 302 and a single DC capacitor 304, and is configured to produce nine voltage levels. The UX-CELL MLI 300 has a U-CELL 306, a leg-CELL 308 and an X-CELL 510, as concurrently presented in FIG. 3. The U-CELL 306 defines two unipolar switching devices with bi-directional current flow capability S1 and S4 (312 and 314) connectable to a load at positive connection point "a" 316 and connected in series with the DC source 302 on opposite poles of the DC source 302. The leg CELL 308 defines two unipolar switching devices with bi-directional current flow capability S3 and S6 (318 and 320) connectable to a load at negative connection point "n" 322 and connected in series with the DC capacitor 304 on opposite poles of the DC capacitor 304. The X-CELL 510 defines two unipolar switching device (S2, S5) and diode combination (the combinations referred to as 502 and 504) that are series connected with a diode 512 and 514 having the same polarity providing unidirectional current flow capability, two unipolar switching devices with bi-directional current flow capability S7 and S8 (524 and 526) positioned on respective crossover links adapted to connect opposite poles of the DC source 302 and of the DC capacitor 304 . . . . The positive poles of the capacitor 304 and the DC source 508 are connectable by activating a unipolar device S2 (502) that is series connected with a diode 512 having the same polarity. The negative poles of the capacitor 304 and the DC source 302 are connectable by activating a unipolar device S5 (504) that is series connected with a diode 514.

Figure 5A:
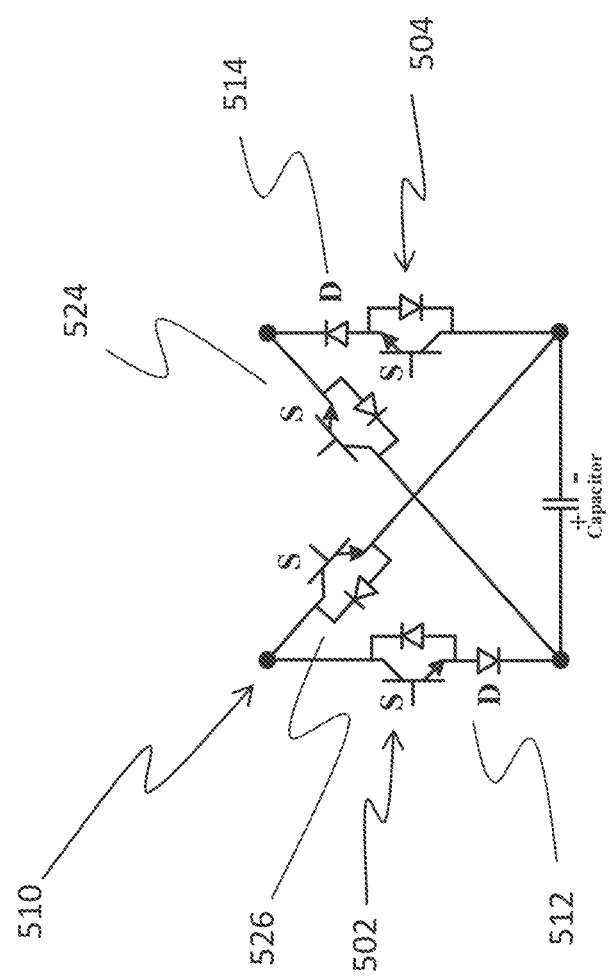
FIG. 5A presents an X-CELL unit of the UX-CELL MLI or converter circuit of FIG. 3, the X-CELL unit has four unipolar devices connected to a capacitor, the two unipolar devices form an X-like link connection between the two other unipolar devices, according to one embodiment.
Figure 5B:
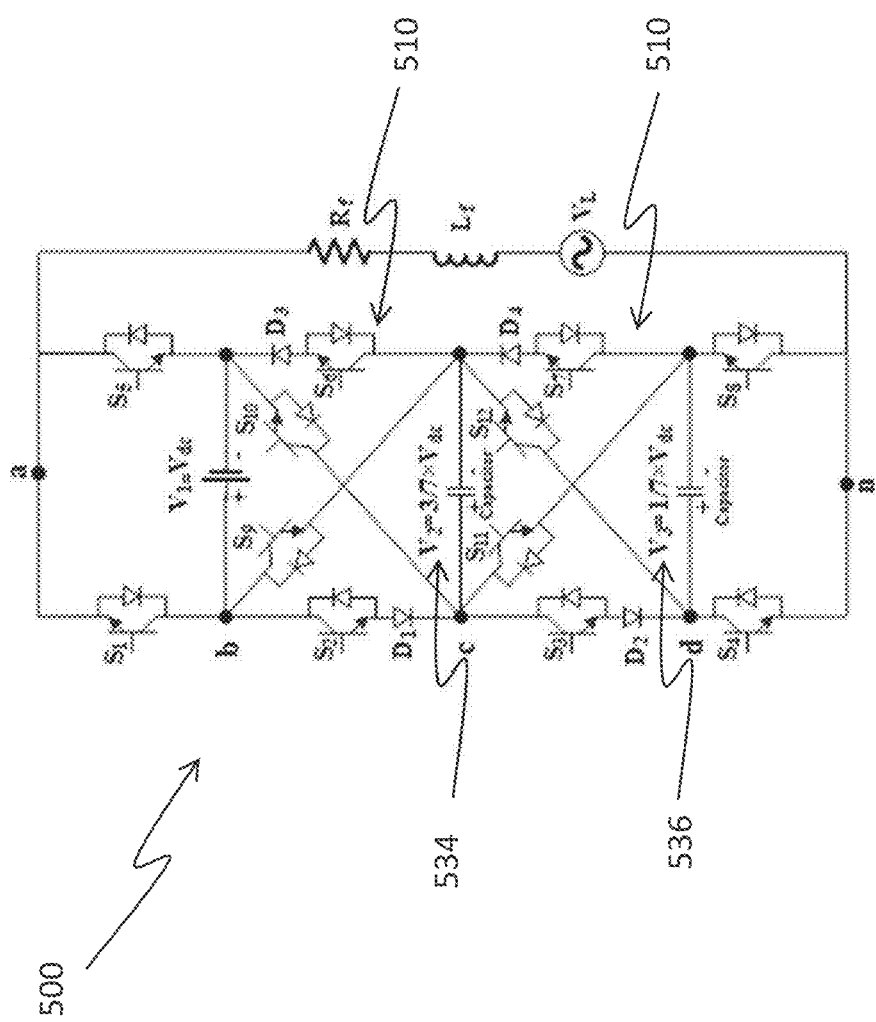
FIG. 5B presents an extended UX-CELL MLI or converter circuit connected to a load, the extended UX-CELL converter circuit has two X-CELL units of FIG. 5A and is adapted to provide a number of twenty-three voltage levels, according to one embodiment.
Figure 5C:
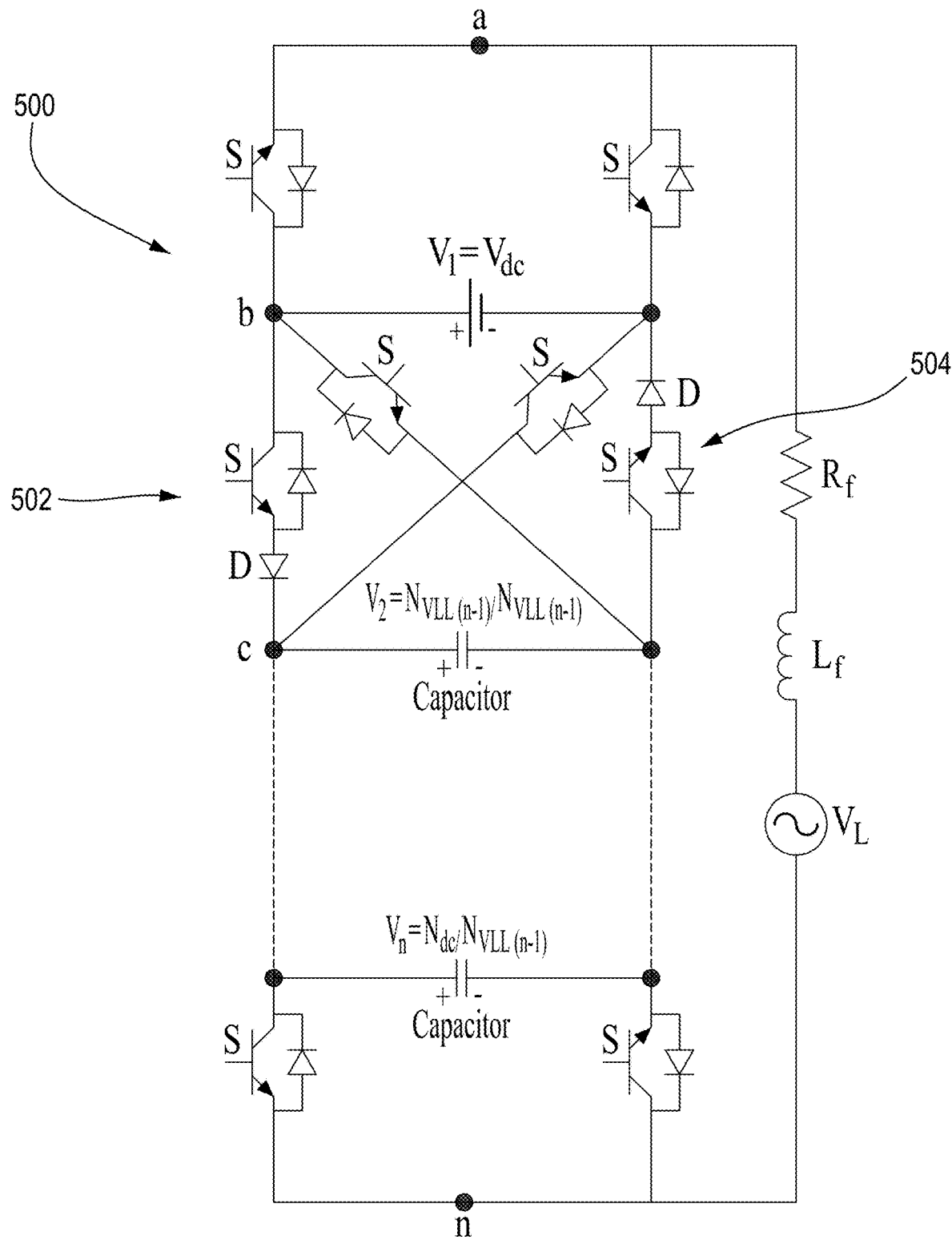
FIG. 5C presents an extendable UX-CELL MLI or converter circuit connected to a load, the extendable UX-CELL converter circuit is depicted as being adapted to be extended by a variety of number of X-CELL units of FIG. 5A, according to one embodiment.

According to one embodiment, the UX-CELL MLI 300 is expandable as presented in FIGS. 5B and 5C. In order to expand the UX-CELL MLI 300, additional X-CELLS 510 of FIG. 5A are added between the U-CELL 306 and the leg-CELL 308. Presented in FIG. 3, according to one embodiment, the expanded UX-CELL MLI 300 is controlled to produce up to twenty-three (23) voltage levels at the output (316 and 322), when the voltage across the capacitor of each X-CELL 510 respects the voltage ratios provided in the voltage ratio table 632 of FIG. 6. For instance, the voltage (V2) of capacitor 534 of the first X-CELL 510 shall be limited to providing three-seventh (3/7) of the DC source 302 voltage (Vdc) and the voltage (V3) of the capacitor 536 of the second X-CELL 510 shall be limited to providing one-seventh (1/7) of the DC source 302 voltage (Vdc). As can be noticed, only twelve unipolar devices, four diodes, one DC source 302 and two capacitors (534 and 536) are required to provide up to twenty-three (23) voltage levels.

According to one embodiment, the voltage ratio table 632 of FIG. 6 presents the number of voltage levels that can be achieved in the expandable UX-CELL MLI 300 of FIG. 3, provided that the voltage limit of each capacitor is respected according to the DC source 302 voltage (Vdc) and corresponding X-CELL 510 position in the expandable UX-CELL MLI 300. The Voltage ratio table 632 of FIG. 6 further presents for each expansion level of the expandable UX-CELL MLI 300 of FIG. 5C: the number ($N_c$) 640 of active and passive power sources (such as DC source 302 and capacitors (534 and 536) for the expanded UX-CELL MLI 300 of FIG. 5B); the total number of power switching devices (i.e. unipolar and bipolar devices) ($N_{PSX}$) 642 and the achievable number of voltage levels ($N_{VLX}$) 644.

The following equation indicates the number of achievable voltage levels according to the number of DC sources (passive and active):

$$N_{VLX} = \left[2 \times \sum_{m=1}^{N_C}(2^m - 1)\right] + 1 \quad (1)$$

where $N_{VLX}$ is the number of achievable voltage levels and $N_c$ is the number of active and passive DC sources.

The following equation indicates the ratio between the number of DC sources (passive and active) and the total number of power switching devices ($N_{PSX}$) (unipolar and bipolar devices):

$$N_c = \frac{N_{PSX}}{4} \quad (2)$$

The following equation indicates the number ($N_{VLX}$) of achievable voltage levels according to the total number of power switches ($N_{PSX}$) (unipolar and bipolar devices), based on the previous two equations (1) and (2):

$$N_{VLX} = \left[2 \times \sum_{m=1}^{\frac{N_{PSX}}{4}}(2^m - 1)\right] + 1 \quad (3)$$

Figure 1B:
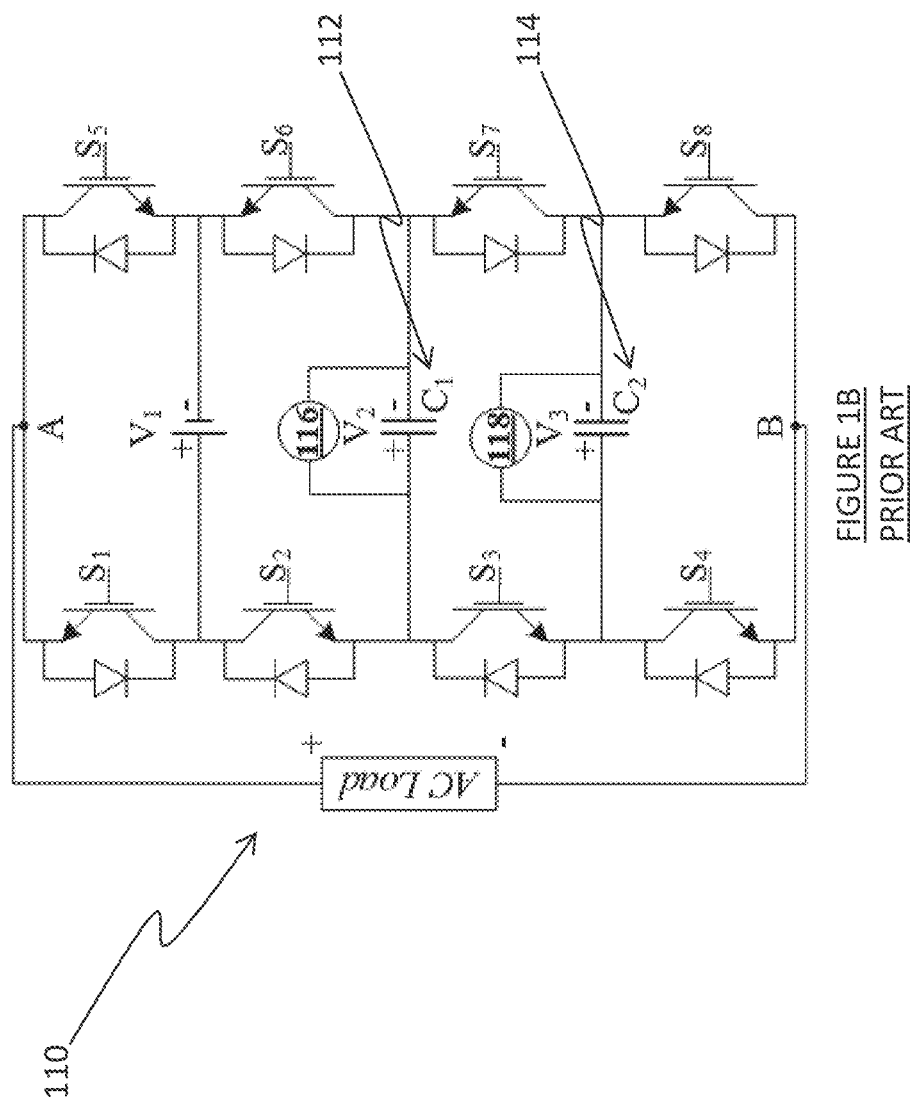
FIGS. 1B, 1C, 1D, and 1E show prior art converter circuits adapted to generate nine voltage levels.
Figure 1C:
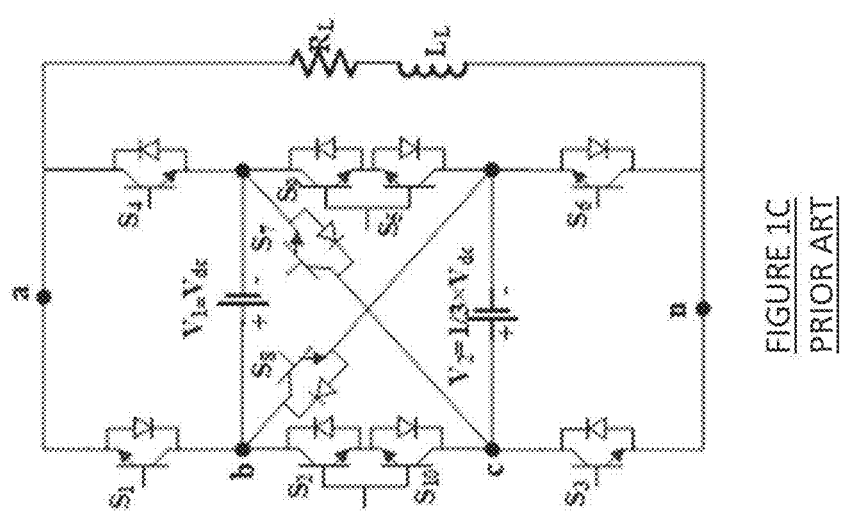
Figure 1D:
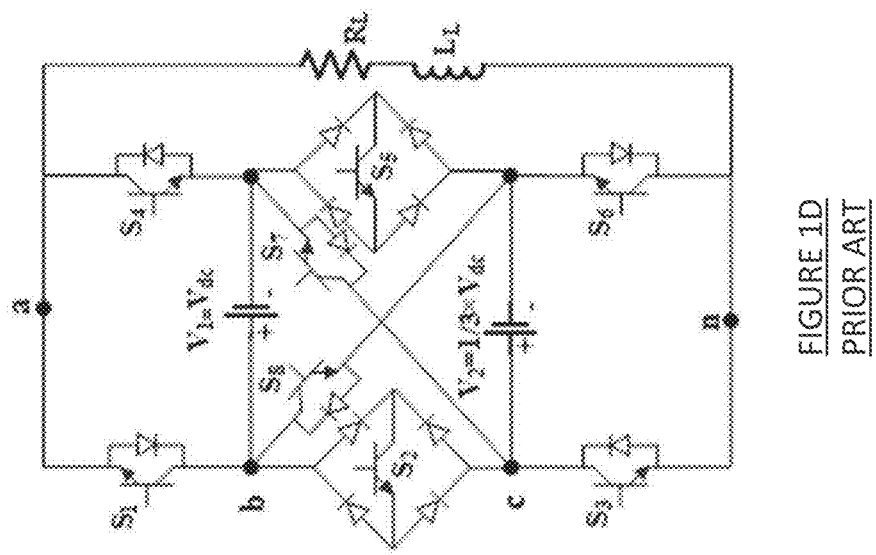
Figure 1E:
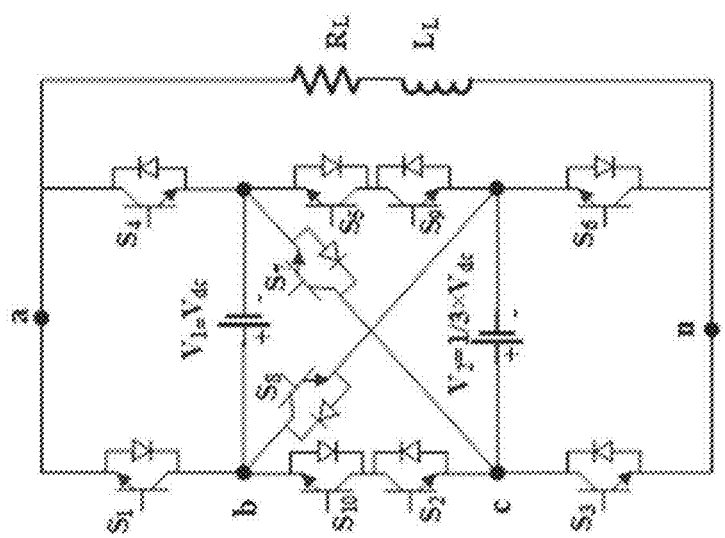
Figure 1F:
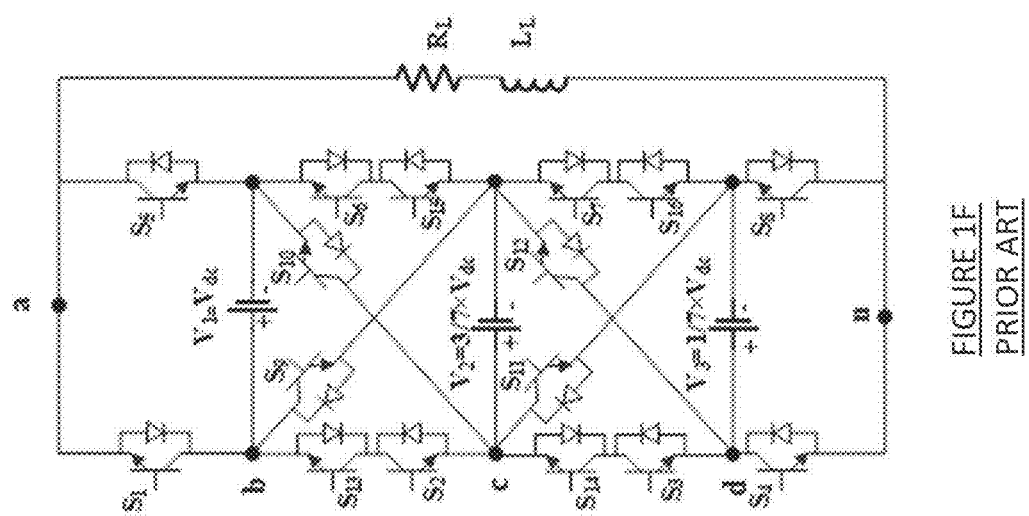
FIGS. 1F, 1G, and 1H show prior art converter circuits adapted to generate twenty-three voltage levels.
Figure 1G:
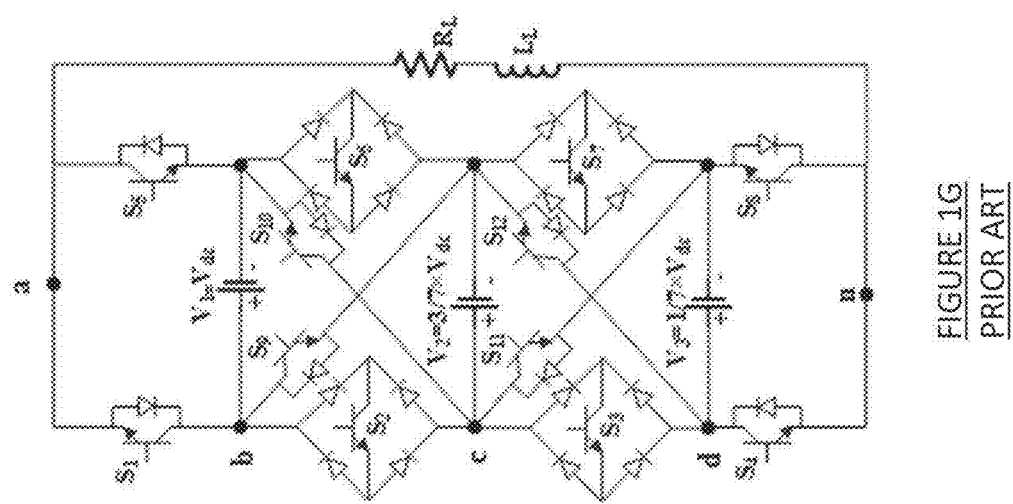
Figure 1H:
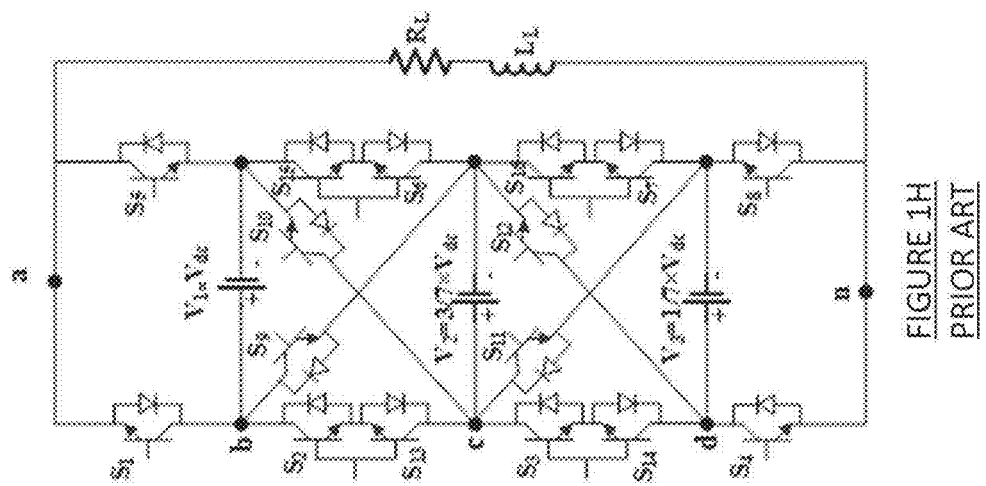
Figure 1I:
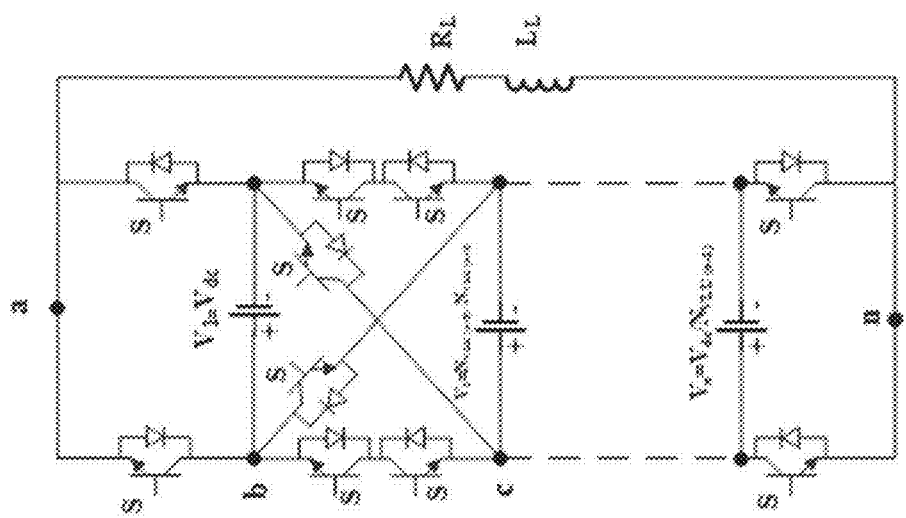
FIGS. 1I, 1J, and 1K show generalized prior art converter circuits.
Figure 1J:
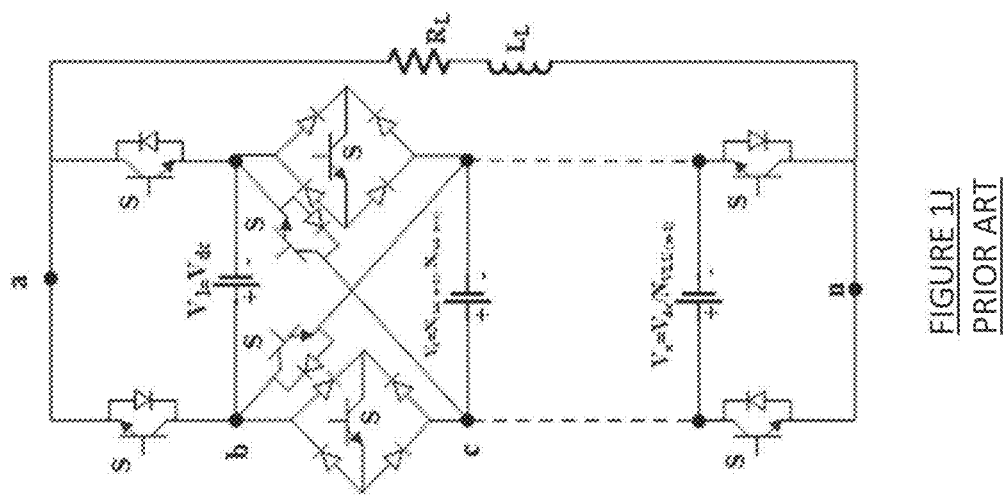
Figure 1K:
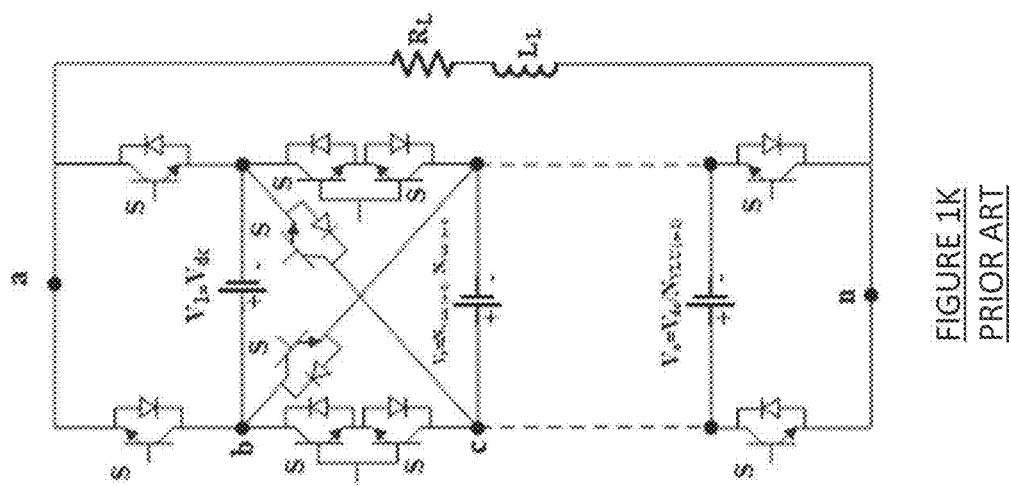

The ratio table 632 of FIG. 6 further presents corresponding metrics of prior art PUC topology 100 and expanded PUC topology 110 as presented in prior art FIGS. 1A and 1B. As can be noticed, for a same number of active and passive power sources ($N_c$) 640 with a few more switching elements (i.e. when comparing values of column ($N_{PSU}$) 652 with ($N_{PSX}$) 642), the number of achieved voltage levels is greater (i.e. when comparing values of column ($N_{VLU}$) 654 with ($N_{VLX}$) 644). The UX-CELL MLI 300 is in fact, capable of providing nearly double the number of voltage levels in comparison with the PUC topology when both are expanded to include five (5) active and passive power sources (i.e. $N_{VLU}$=63 voltage levels and $N_{VLX}$=115 voltage levels).

Moreover, the UX-CELL MLI 300 is capable of providing a boosted voltage at its output (316 and 322). Depending on the number of X-CELLS included in the UX-CELL MLI 300, the MLI 300 is capable of providing one third (Vdc/3) higher output voltage than the DC source, in fact the peak output voltage can reach 4/3 Vdc. For instance, the UX-CELL MLI 300 of FIG. 3 is capable of producing a peak voltage at its output (316 and 322) that is thirty-three percent (33%) greater than the DC source 302, without requiring an additional reactive component such as a transformer.

Nine-Level UX-Cell Inverter Operation and Modeling

As can be noticed, the switches of the UX-CELL MLI 300 have only two states (i.e: "off" (S=0) or "on" (S=1)). When the switching device is controlled to be at the "off" state, the current is blocked. When the switch is controlled to be at the "on" state, the switch is saturated and the current is allowed to pass through. The UX-CELL MLI 300 of FIG. 3 is controlled with sixteen ($2^4$=16) switching states in which seven switching states are redundant (see FIG. 2A).

According to one embodiment, by controlling the switching states of the UX-CELL MLI 300 of FIG. 3, the MLI 300 is capable of producing nine voltage levels at the output (316 and 322) when the voltage (V2) of the capacitor 304 is equal to one-third of the voltage (V1 or Vdc) of the DC source 302 (i.e. V2=1/3*Vdc). Presented in switching state table 200 of FIG. 2A are the output voltage levels 202 that the UX-CELL MLI 300 is capable of producing. When the switches of the UX-CELL MLI 300 are controlled in accordance with the listed states 204 indicated in the table 200, the UX-CELL MLI 300 produces nine output voltage levels 202. Each switching state 204 is associated to a combination of blocked or saturated states for each switch of the UX-CELL MLI 300.

It shall be recognized that in the UX-CELL MLI 300 of FIG. 3, switches S1, S4 (312 and 314) and S3, S6 (318 and 320) are complimentary, which means that when S1 (312) is blocked, S4 (314) must be saturated and vice versa. Moreover, among middle cell switches (i.e. the X-CELL 510 switches) S2, S5, S7 and S8 (502, 504, 524 and 526), the saturation of only one switch is needed at the same time so as to prevent short circuit between positive and negative terminals of the DC voltage source 302 and/or capacitor 304.

Figure 4:
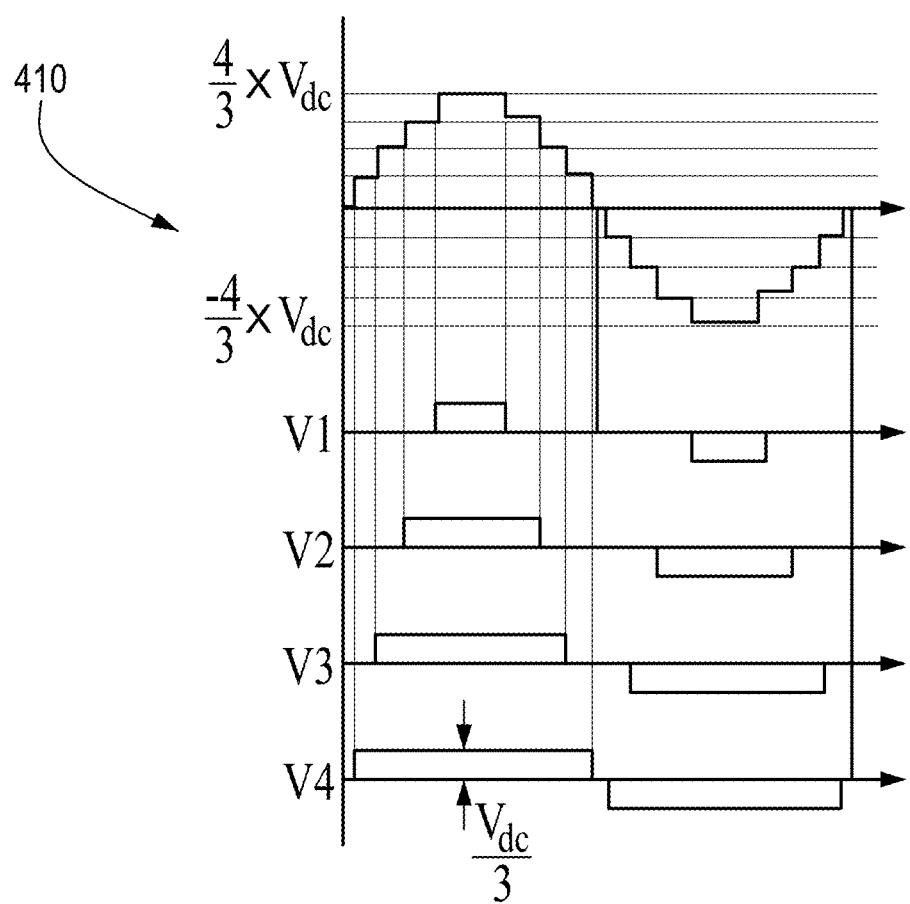
FIG. 4 presents waveforms produced by the UX-CELL MLI or converter configuration of FIG. 3 and depicting the nine voltage levels as the unipolar devices are being controlled to produce a quasi-sine wave signal, according to one embodiment.

Further presented in FIG. 2A is a capacitor charging status 206 in accordance with the various switching states. An upward arrow "↑" indicates a charging status, a downward arrow "↓" indicates a discharging status, and a dash "-" indicates a no effect status or neutral status of the capacitor 304. Based on the switching states 204 and the charging states 206 of the capacitor 304, the various voltage levels produced at the output of the UX-CELL MLI 300 are presented in the voltage level graph 410 of FIG. 4. As can be noticed, the graph 410 of FIG. 4 presents a stepped sine wave with nine voltage levels (i.e. an AC output waveform exhibiting multiple steps at nine voltage levels). In fact, the switches of the UX-CELL MLI 300 are controlled in accordance with the switching states of table 200 to produce a nine voltage level stepped sine wave.

Figure 2B:
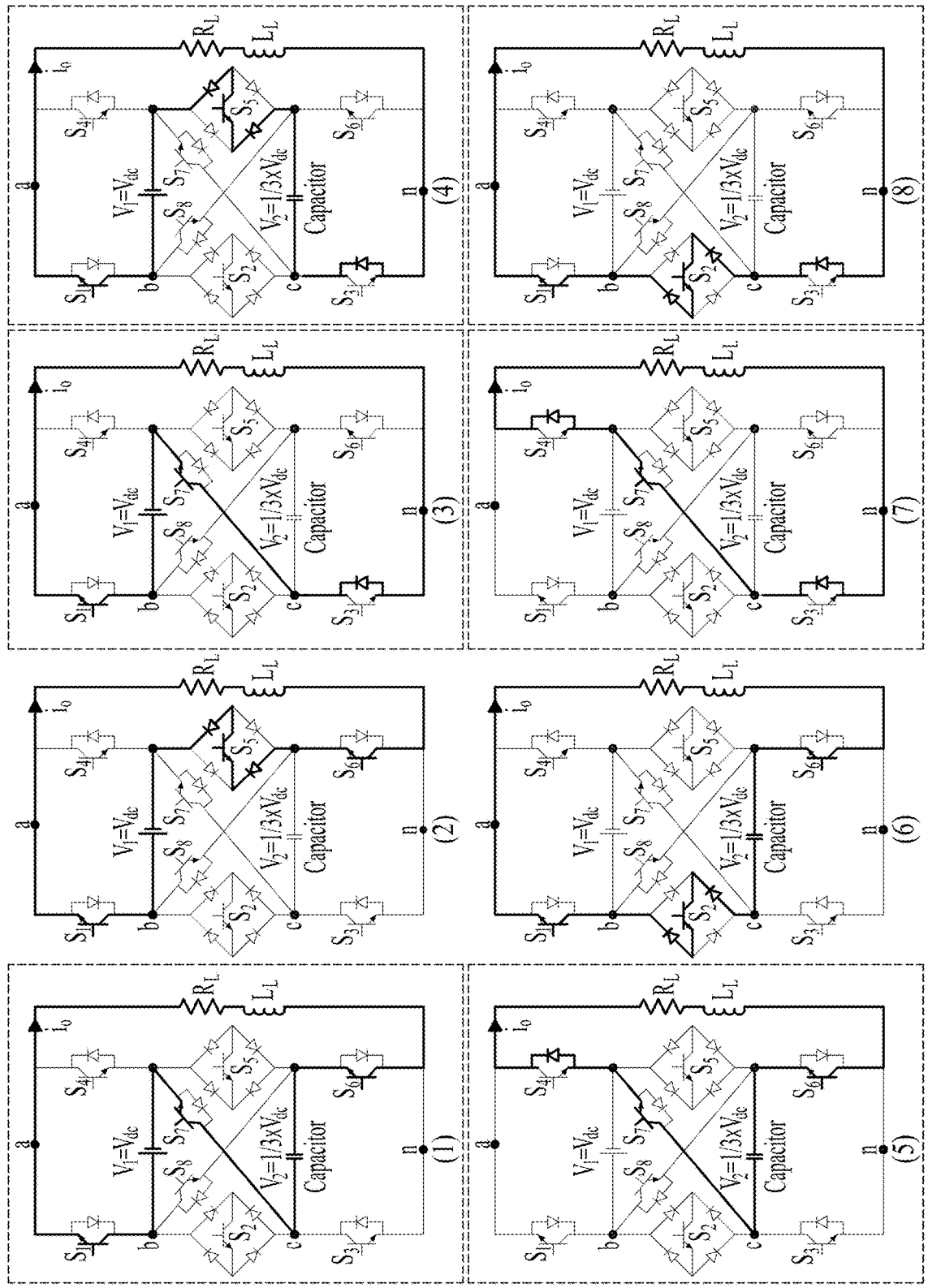
FIG. 2B presents various current paths of the UX-CELL MLI or converter of FIG. 3, in accordance with associated switching states of FIG. 2A, according to one embodiment.
Figure 2B:
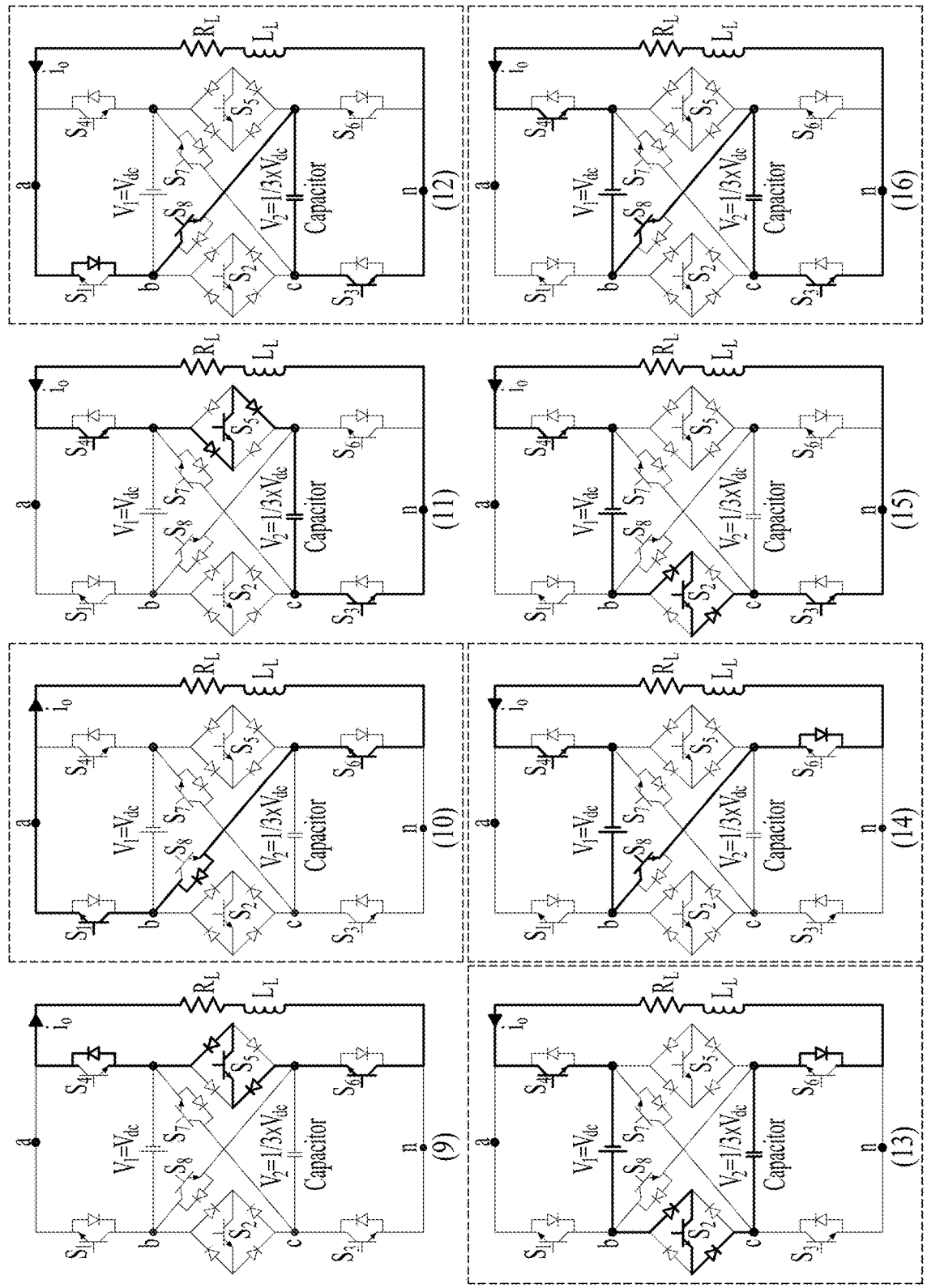

Presented in FIG. 2B, are the various current paths of the Nine-Level UX-CELL MLI 300 when controlled in accordance with each switching state of table 200 of FIG. 2A.

According to one embodiment, the UX-CELL MLI 300 is controlled according to only a subset of switching states. The subset of switching states may be a set of desired switching states that reduce the use of specific switching elements or diodes that have a shorter life or are not as effective. According to one embodiment, in order to decrease fabrication cost, only ultra-fast diodes are used in switches S2 and S5 as presented in FIG. 3. However, ultra-fast standard diodes are known to be less effective and present greater losses, therefore, the set of desired switching states 1, 3, 4, 5, 10, 12, 13, 14 and 16 is selected to produce the nine voltage levels. The corresponding current paths of the desired switching states are presented in dashed lines in FIG. 2B, as indicated by dashed lines.

According to one embodiment, only the set of desired switching states 1, 3, 4, 5, 10, 12, 13, 14 and 16 is selected to produce the nine voltage levels and an UX-CELL MLI 300 is controlled to produce the nine voltage levels according to the set of desired switching states. The UX-CELL MLI 300 is presented in FIG. 3 and has two unipolar device and diode combination (502 and 504) providing unidirectional current flow capability. The positive poles of the capacitor 304 and the DC source 508 are connectable by activating a unipolar device S2 (502) that is series connected with a diode 512 having the same polarity. The negative poles of the capacitor 506 and the DC source 302 are connectable by activating a unipolar device S5 (504) that is series connected with a diode 514.

Figure 7:
FIG. 7 depicts a table presenting a comparison of the number of required components for known nine-level inverter topologies and the UX-CELL MLI or converter circuit, according to one embodiment.

Presented in FIG. 7 is a comparison table 700 of known nine-level inverter topologies and the UX-CELL MLI 300 of FIG. 3. As can be noticed, the UX-CELL MLI 300 requires only a single capacitor 304, whereas the other known topologies require a greater number of capacitors. The number of diodes is limited to two. The total number of switches is limited to eight switches, which is amongst the lowest number of switches in comparison with other known topologies.

Control of the UX-CELL MLI

According to one embodiment, the UX-CELL MLI 300 in grid-connected mode is controlled by a controller 800 adapted to control the switches S1 to S8 according to an MPC method. The various switching states are determined according to the MPC method.

Where i=(1, 2, 3, 4, 5, 6, 7, 8) the definition of Sis as per below.

$$S_i = \begin{cases} 0 \text{ if } S_i \text{ is off} \\ 1 \text{ if } S_i \text{ is off} \end{cases} \quad (4)$$

According to the UX-CELL MLI 300 of FIG. 3, where $V_{an}$ is the voltage between points "a" and "n" of the MLI 300; $V_{ab}$ is the voltage between points "a" and "b" of the MLI 300; $V_{bc}$ is the voltage between points "b" and "c" of the MLI 300; and $V_{cn}$ is the voltage between points "c" and "n" of the MLI 300:

$$V_{an} = V_{ab} + V_{bc} + V_{cn} \quad (5)$$

$$\begin{cases} V_{ab} = -(1 - S_1) \times V_{dc} \\ V_{bc} = (1 - S_2) \times [S_7 V_{dc} - S_8 V_c + S_5(V_{dc} - V_c)] \\ V_{cn} = (1 - S_3) \times V_c \end{cases} \quad (6)$$

$$\begin{cases} i_1 = S_1 i_L \\ i_2 = S_2 i_L \\ i_3 = S_3 i_L \\ i_4 = S_4 i_L \end{cases} \quad (7)$$

$$V_{an} = V_L + (i_L \times R_f) + \left(L_f \times \frac{di_L}{dt}\right) \quad (8)$$

Where $V_{an}$ is the UX-CELL MLI 300 output voltage vector, $i_L$ is the load current, $V_L$ is the active load (or grid) voltage, $R_f$ is the load resistance, $L_f$ is the load inductance, $V_{dc}$ is the voltage of the DC voltage source 302, and $V_c$ is the voltage of the capacitor 304.

According to Euler, forward approximation, $$\frac{di_L}{dt}$$

is defined as:

$$\frac{di_L}{dt} \approx \frac{i_L(k+1) - i_L(k)}{T_s} \quad (9)$$

From (8) and (9), it can be written that:

$$i_L(k+1) = \left(1 - \frac{R_f \times T_s}{L_f}\right) \times i_L(k) + \frac{T_s}{L_f} \times (V_{an}(k) - V_L(k)) \quad (10)$$

Where $i_L(k+1)$ is the predicted load current, $V_L(k)$ is the measured grid voltage. Regarding equations (8) and (6), $V_{an}(k)$ is calculated as per below:

$$V_{an}(k) = \{(S_1 - 1) \times V_{dc}\} + \quad (11)$$

$$\{(1 - S_2) \times [S_7 V_{dc} - S_8 V_c + S_5(V_{dc} - V_c)]\} + \{(1 - S_3) \times V_c\}$$

Employing Ohm's Law for capacitors, $$i_c = C \frac{dV_C}{dt} = (S_3 - S_2 - S_7) \times i_L \quad (12)$$

Where $i_c$ is the instantaneous current through capacitor one, C is the capacitance of the capacitor one, and $$\frac{dV_C}{dt}$$

is the instantaneous rate of voltage change of capacitor one. It should be mentioned that the capacitor current is approximated when the internal resistance of capacitors is ignored. Applying Euler forward approximation, $$\frac{dV_C}{dt}$$

is obtained as:

$$\frac{dV_C}{dt} \approx \frac{V_C(k+1) - V_C(k)}{T_s} \quad (13)$$

Replacing (13) in (12), (14) is obtained $$V_C(k+1) = \frac{(S_3 - S_2 - S_7)}{C_1} \times i_L(k) \times T_s + V_C(k) \quad (14)$$

where $V_C(k+1)$ is the predicted capacitor voltage.

The cost function G is formulated as:

$$G = K_1 \times (i_L(k+1) - i_L(K+1)^*)^2 + K_2 \times (V_C(k+1) - V_C(K+1)^*)^2 \qquad (15)$$

Where $K_1$, $K_2$ are weighting factors used to prevent coupling effects of different variables. The cost function g is calculated for the nine possible switching states of the switching state table 400 in each sampling time. The switching state is then selected according to the minimal cost function.

Referring to the fact that the load current variation in comparison with sampling frequency is negligible, it can be written that $i_L(K+1)^* = i_L(K)^*$, thus $i_L(K+1)^*$ in equation (15) can be replaced by $i_L(K)^*$.

Simulation Parameters

According to one embodiment the UX-CELL MLI 300 of FIG. 3 is connected to the grid and is controlled according to the parameters presented in table 1000 of FIG. 10. As indicated in the table 632 of FIG. 6, the voltage of the capacitor 304 is equal to 1/3×Vdc. It shall be recognized that the switches S7, S8 support 4/3×Vdc, that the switches S1, S2, S4, S5, support Vdc, and that switches S3, S6 only support 1/3×Vdc.

Figure 9:
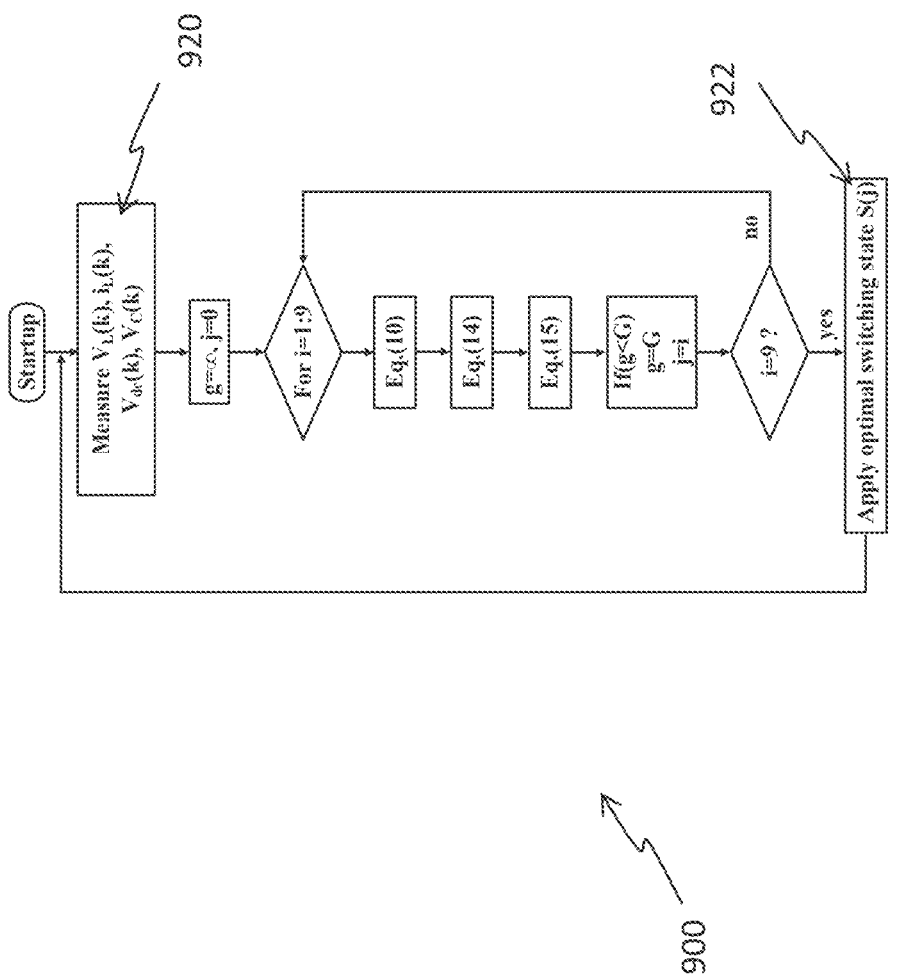
FIG. 9 presents a flowchart of the MPC control method of FIG. 7, according to one embodiment.

According to the MPC control method 900 presented in FIG. 9, the voltage (Van), grid current (iL), DC link voltage (Vdc) and capacitor voltage (Vc) are measured from the Grid (step 920). Then the cost function ($G_{MPC}$) is calculated based on equations (10), (14), (15) for nine possible switching states of Table 200 of FIG. 2A in each sample time. According to one embodiment, the switching state having the lowest cost function ($G_{MPC}$) is selected and applied (step 922). In other words, at least one control signal is generated for the switches of the power converter, in accordance with the selected switching state, and the at least one control signal is issued to the switches.

It should be mentioned that ωτ of the grid voltage (utilizing phase-locked loop or PLL) is used to generate the reference current for MPC.

Simulation Results

Figure 11:
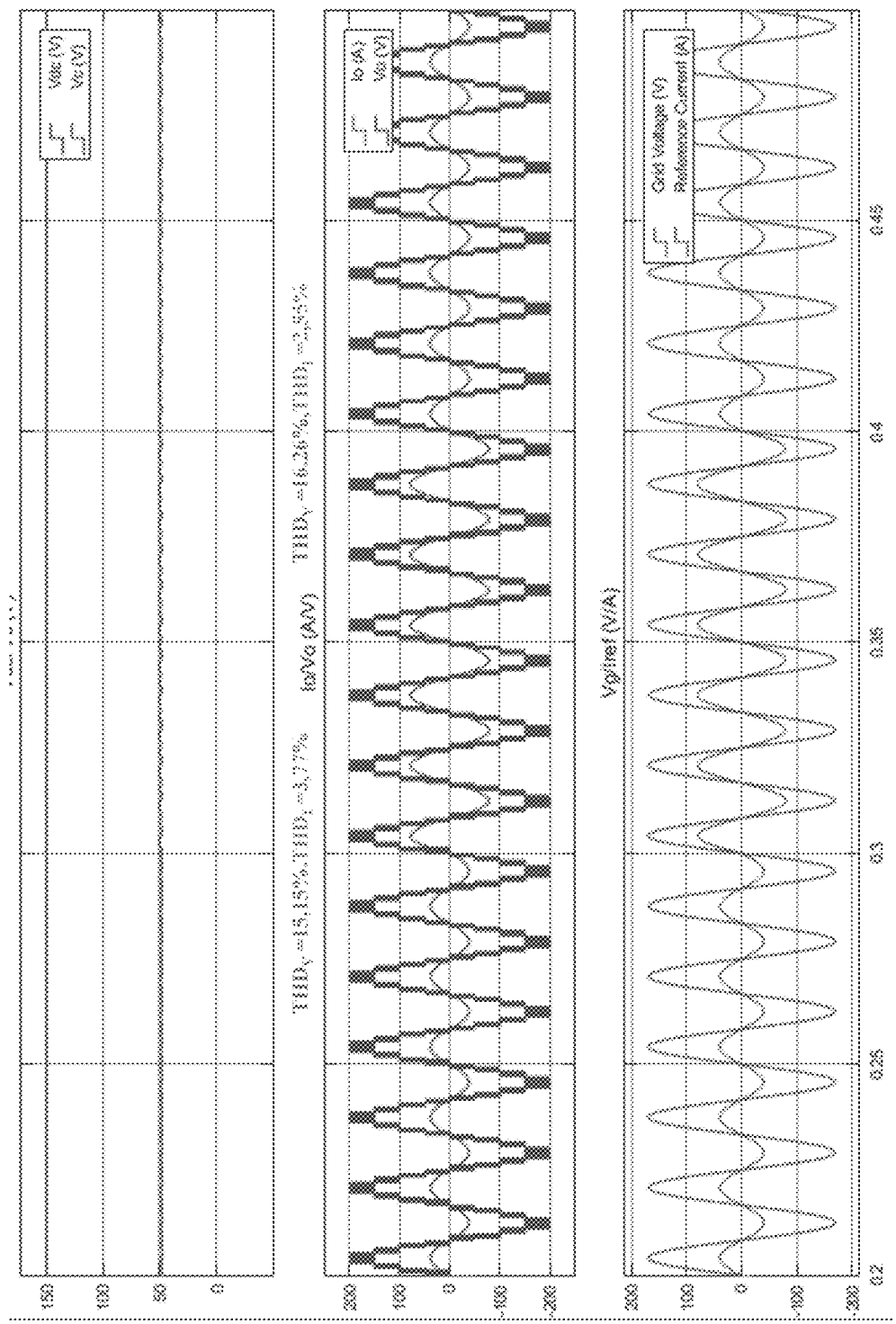
FIGS. 11 to 14 illustrate simulation results for output parameters and total harmonic distortion (THD) analysis of the UX-CELL MLI in a grid-connected operation mode of FIG. 3, according to one embodiment.
Figure 12:
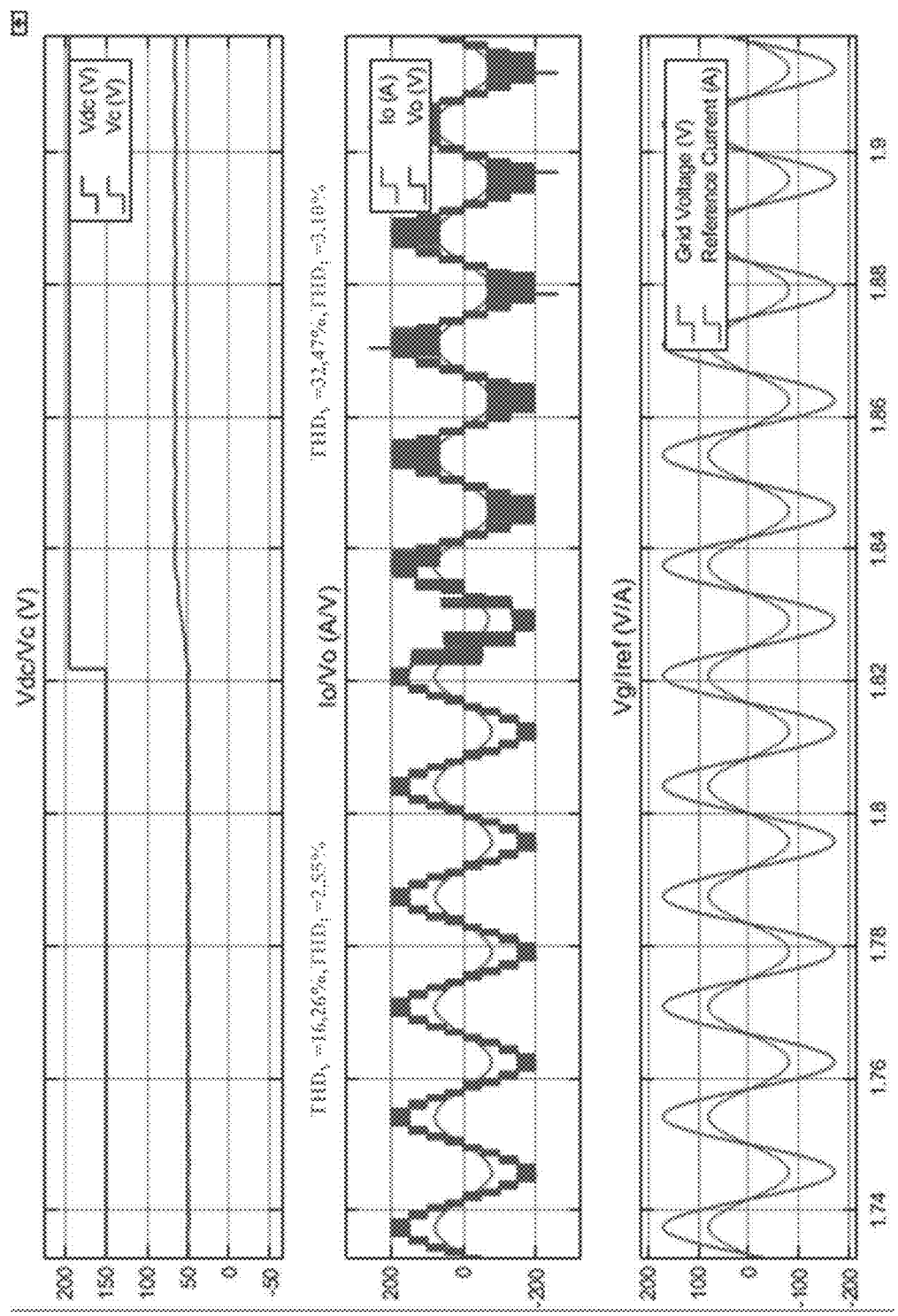
Figure 13:
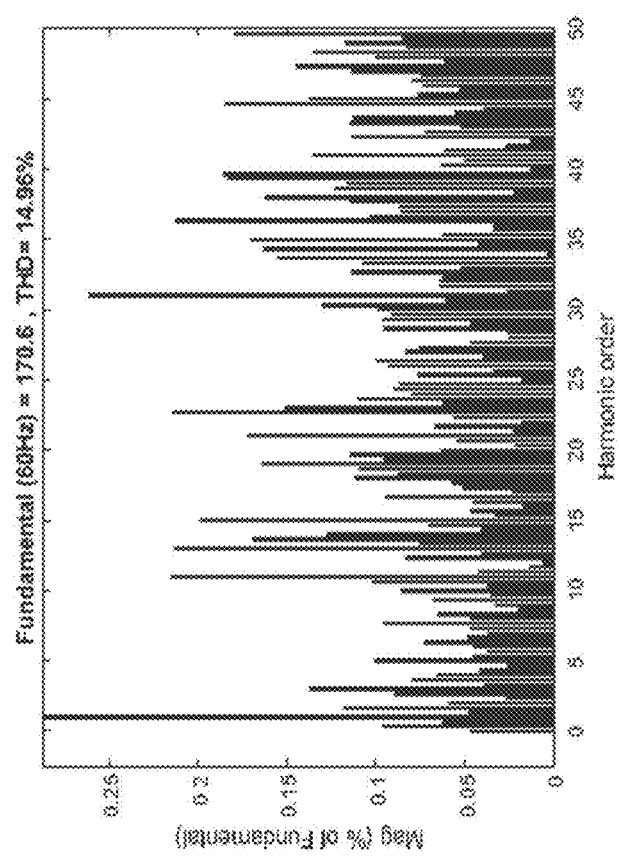
Figure 14:
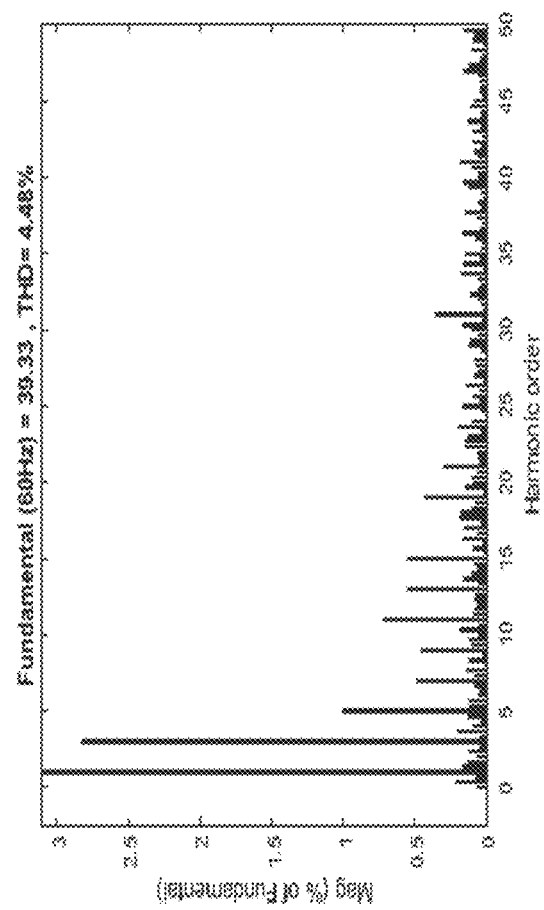

In one embodiment, the simulation is performed using the UX-CELL MLI 300 presented in FIG. 3. The parameters used in the simulation are shown in the table of FIG. 10. FIG. 11 present inverter output voltage ($V_o$ or $V_{an}$), grid current ($i_o$ or $i_L$), capacitors voltage (Vdc, Vc), reference current (Iref), and grid voltage (Vg or VL) when reference current increases from 4 amps to 8 amps and returns to 4 amps, while the DC source 302 voltage is 150V (Vdc=150V) and the AC Grid Voltage is 120V RMS. After that, the DC voltage source is increased from 150V to 195V, while the AC Grid Voltage remains equal to 120V RMS (See FIG. 12). FIGS. 13 to 14 show total harmonic distortion (THD) of the UX-CELL 300 output voltage, grid current, when the DC voltage source is equal to 150V, while the AC grid voltage remains stable at 120V RMS. It can be seen that, in this embodiment, the capacitor 304 voltage is balanced at the desired value and presents relatively small and acceptable ripples. In addition, the system 300 has fast transient and the output THD of the system is acceptable at different points. For instance, the THD of output current is below 4.48%, which is acceptable. Furthermore, the THD of inverter output voltage when dc voltage is equal to 150V is 14.96%, which is proper for a nine-level inverter. It should be mentioned that when the grid voltage is 120V RMS (170V peak-to-peak) and Vdc=190V, the controller decreases two levels from inverter output voltage in order to adapt the output of the inverter with the grid voltage. As a result, the THD of output voltage in this situation is equal to 32.47% (See FIG. 12).

Experimental Results

Figure 16:
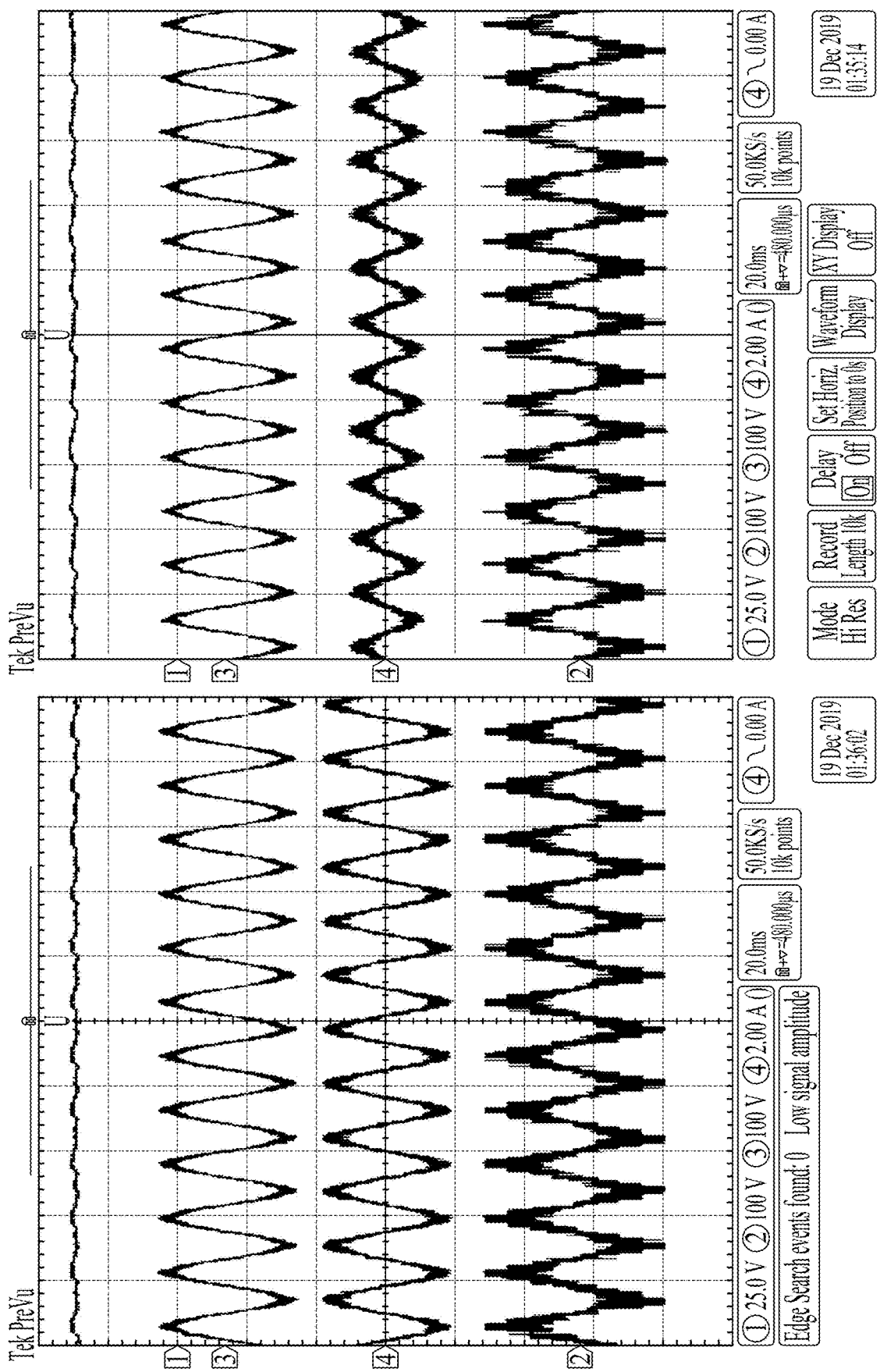
FIG. 16 presents the grid voltage, the inverter output voltage, the inverter output current and the capacitor voltage of the UX-CELL MLI or converter in grid-connected operation mode of FIG. 3 when the reference current is decreased from 2 A to 1 A, according to one embodiment.
Figure 17:
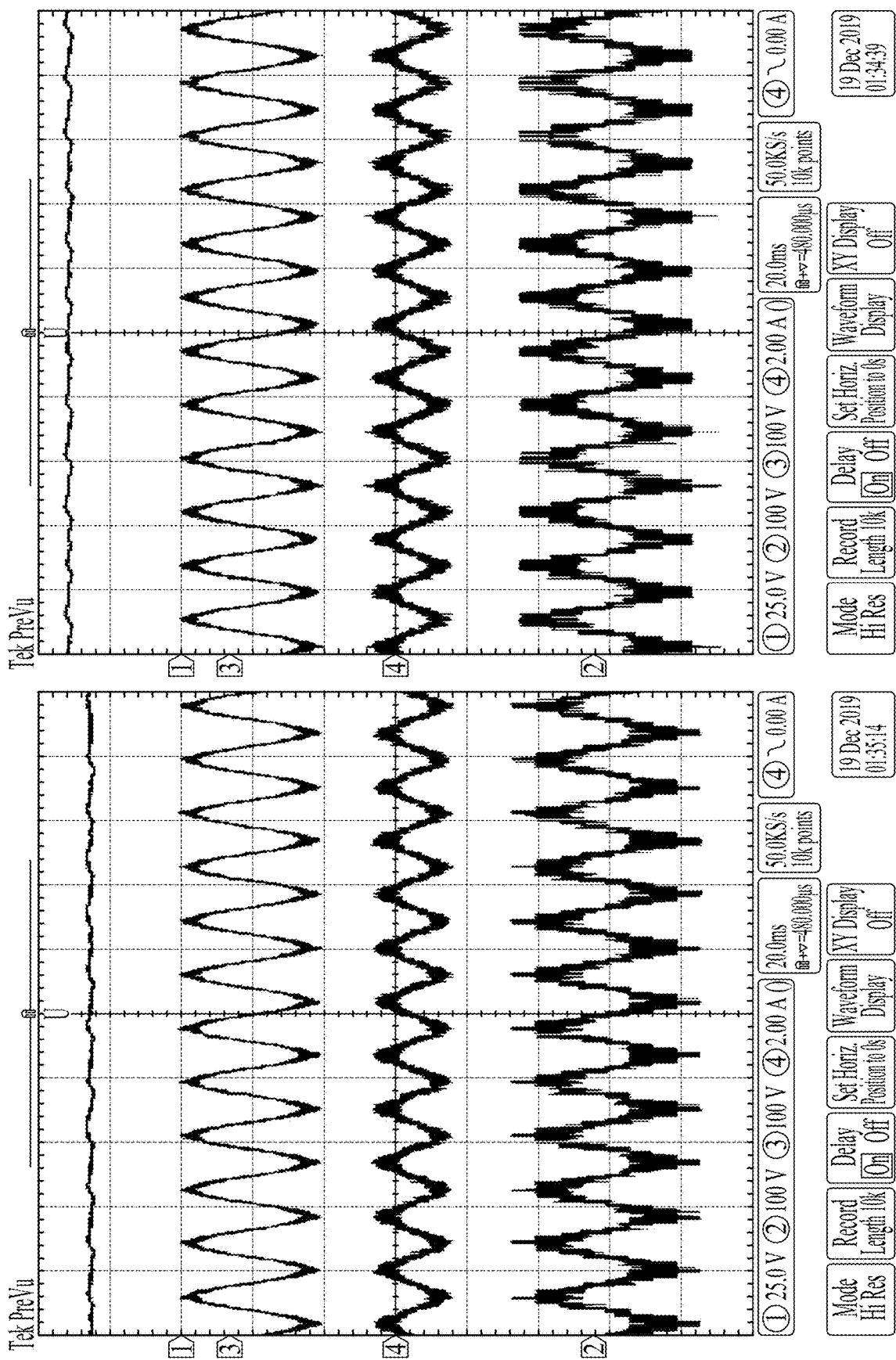
FIG. 17 illustrates a grid-connected operation of a printed circuit board (PCB) of the UX-CELL MLI or converter of FIG. 3 while DC link voltage is increased from 100V to 120V in order, according to one embodiment.

In one embodiment, for obtaining experimental results, the PCB of the UX-Cell inverter 300 of FIG. 3 is first designed with Altium designer software. Then through using a "dSpace 1103" controller and an OPAL-RT high current/high voltage measurement real-time simulator, the proposed control technique is applied on this inverter topology 300. It should be understood that any other suitable designer software, controller technology, and real-time simulator technology may apply. The system parameters are presented in table 1500 of FIG. 15, according to one embodiment. FIGS. 16 and 17 show grid voltage, inverter output voltage, inverter output current, and for grid-connected modes of operation when the reference current is reduced from 2 amps to 1 amps, and the DC voltage source is raised from 100V to 120V, respectively.

Alternate Extended UXU-CELL

Figure 18:
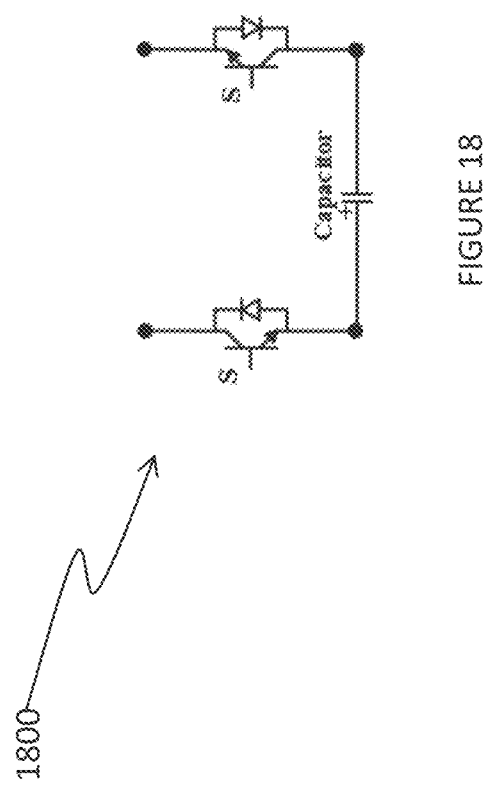
FIG. 18 presents a single U-Cell, according to one embodiment.

FIGS. 5A and 18 present a single X-Cell 510 and single U-Cell 1800 respectively. According to one embodiment, the UX-CELL MLI 300 is extended with a U-CELL 1800, forming a UXU-CELL MLI 1910, 1920, and 1930 as presented in FIGS. 19A, 19B, and 19C. The UXU-CELL MLIs 1910, 1920, and 1930 of FIGS. 19A, 19B, and 19C. are capable of generating twenty-one (21) voltage levels. In order to balance the capacitor voltage at desired level and have a symmetric output waveform, switching states 1 and 32 in table 2000 of FIG. 20 have been omitted so only nineteen (19) switching states remain. As a result, the topologies 1910, 1920, and 1930 are capable of generating a symmetric waveform with the single DC source 262 by generating nineteen (19) voltage levels at its output. The associated switching states for generating nineteen (19) voltage levels are presented in switching state table 2000 of FIG. 20. FIG. 21 further presents the corresponding current paths for each switching state of table 2000.

Figure 19A:
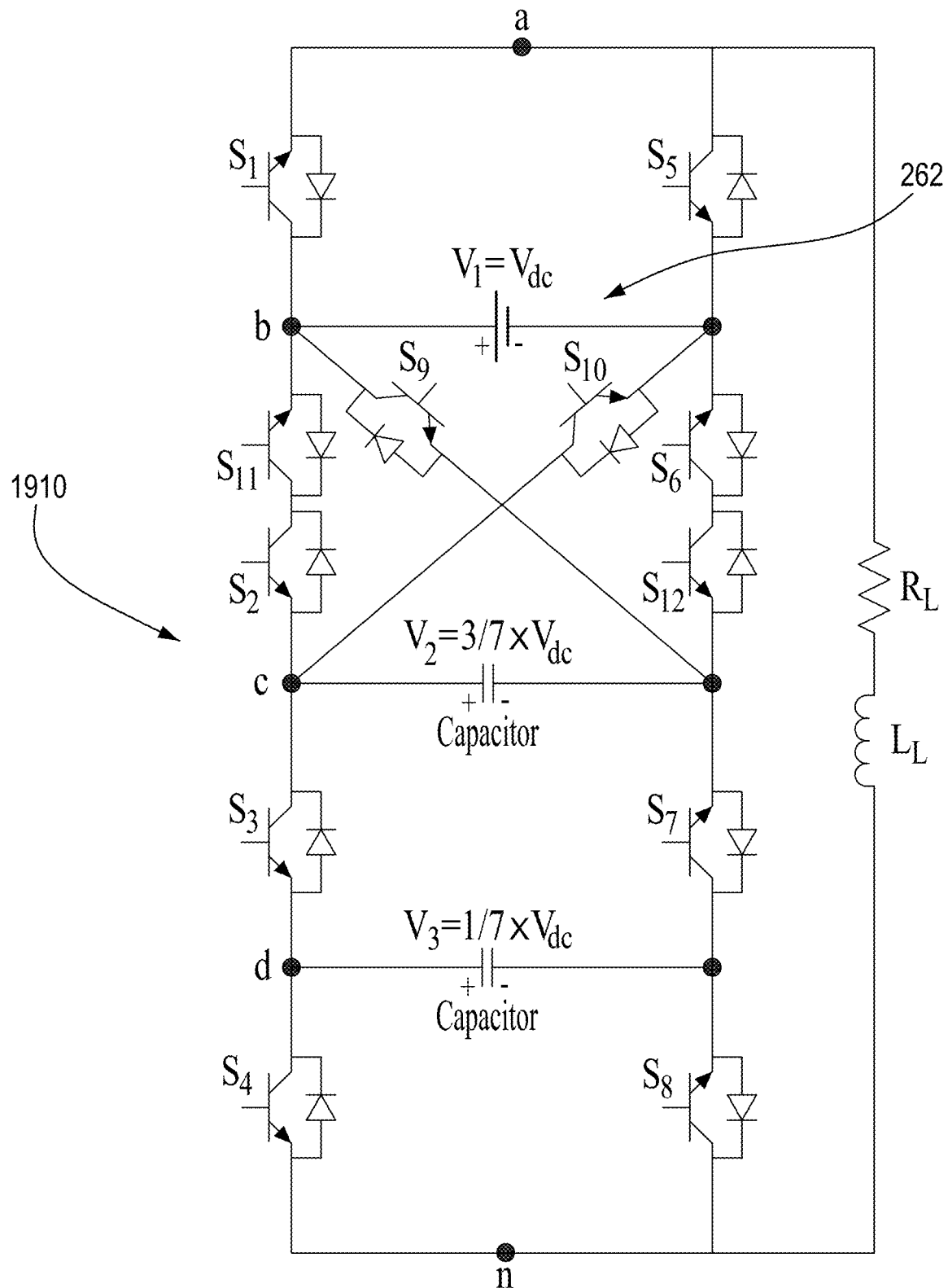
FIGS. 19A, 19B and 19C present UXU-CELL MLI or converter circuits that are hybrid topologies of the UX-CELL MLI or converter having the single UX-CELL of FIG. 5A and the single U-CELL of FIG. 18 adapted to provide a number of twenty-one voltage levels, according to one embodiment.
Figure 19B:
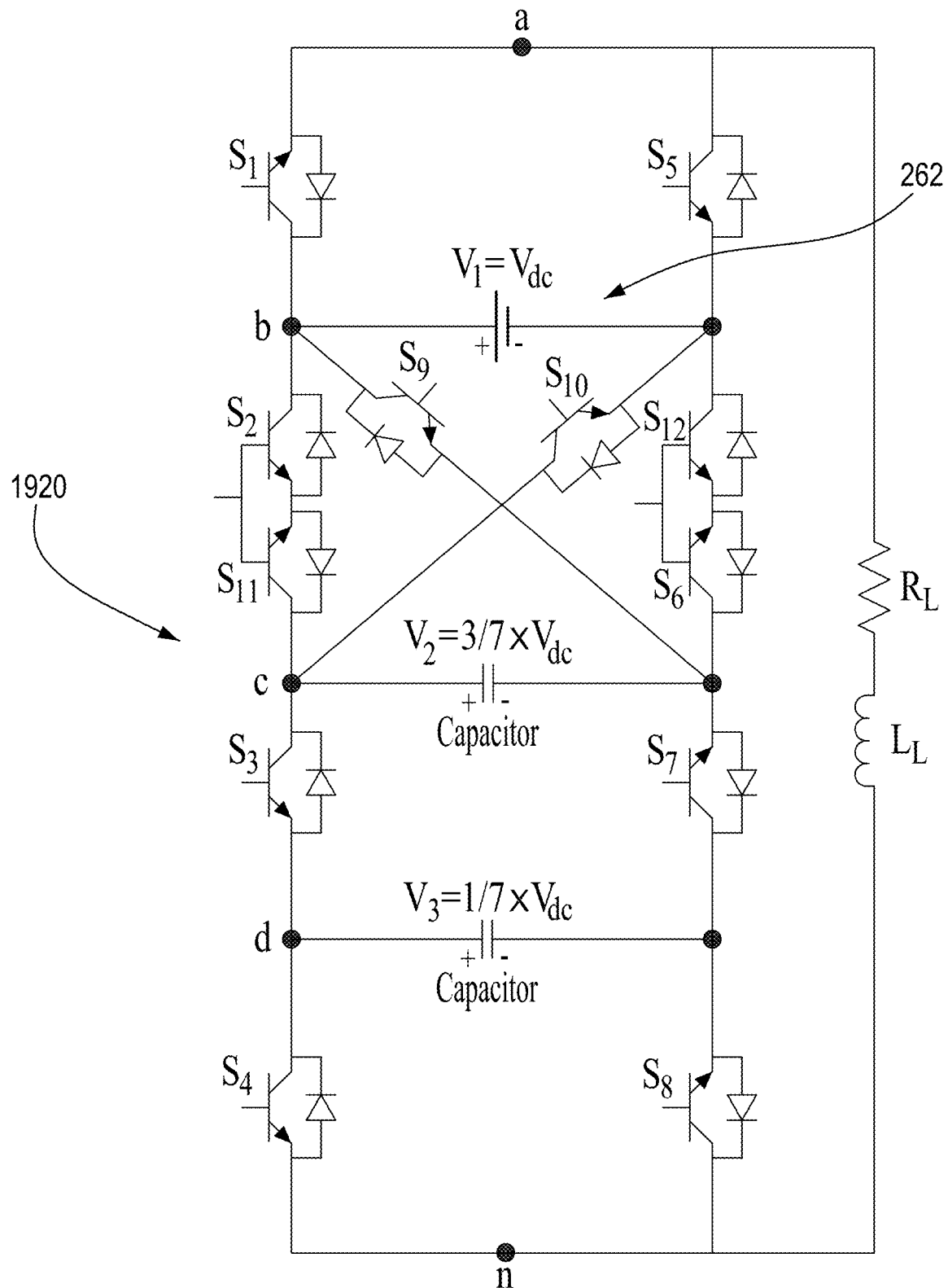
Figure 19C:
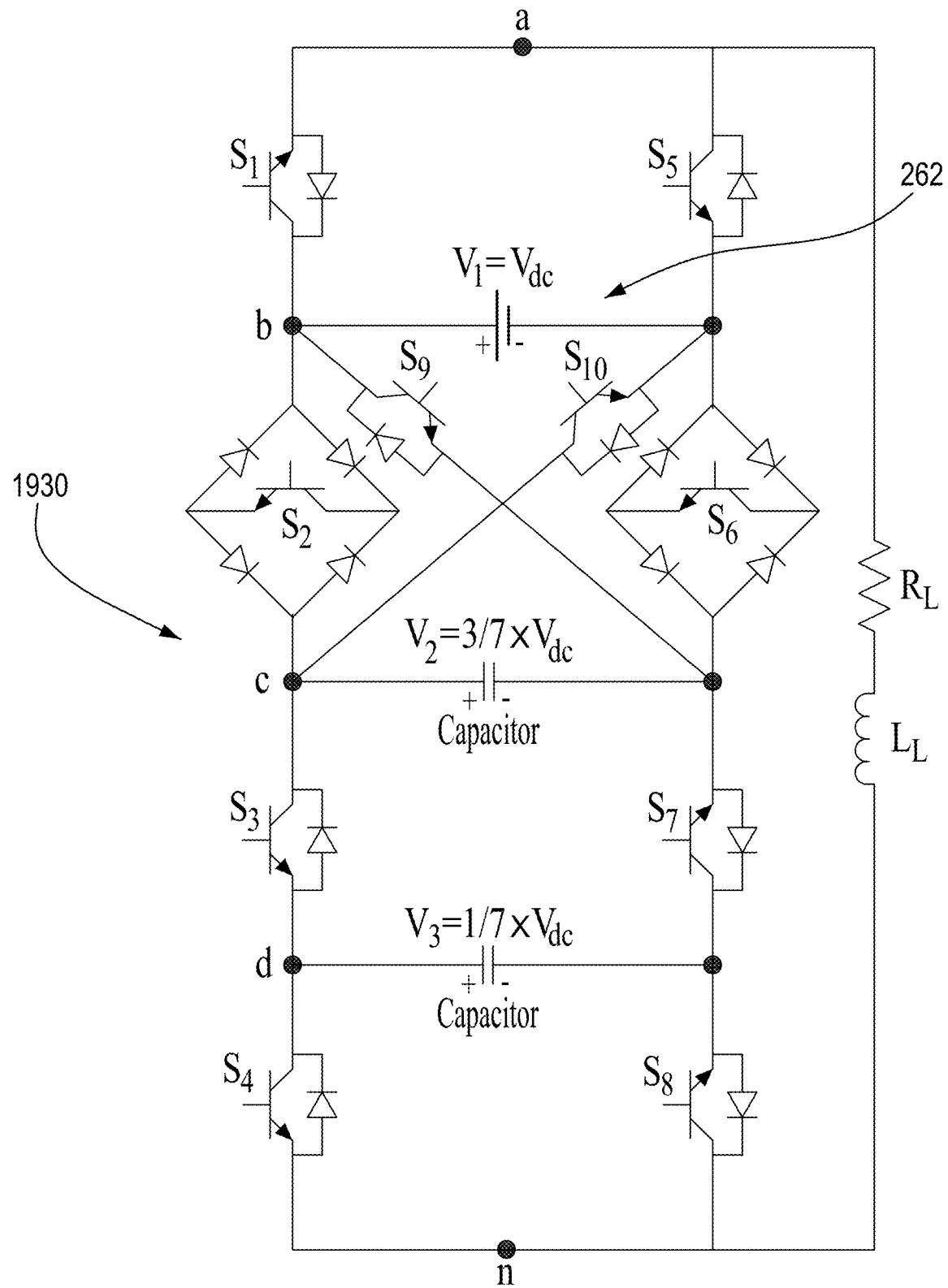
Figure 20:
FIG. 20 depicts a table presenting values of produced voltage levels by the hybrid UXU-CELL MLI or converter of FIGS. 19A to 19C according to switching states of switches S1 to S10 and associated charging states of capacitors C1 and C2, according to one embodiment.
Figure 21:
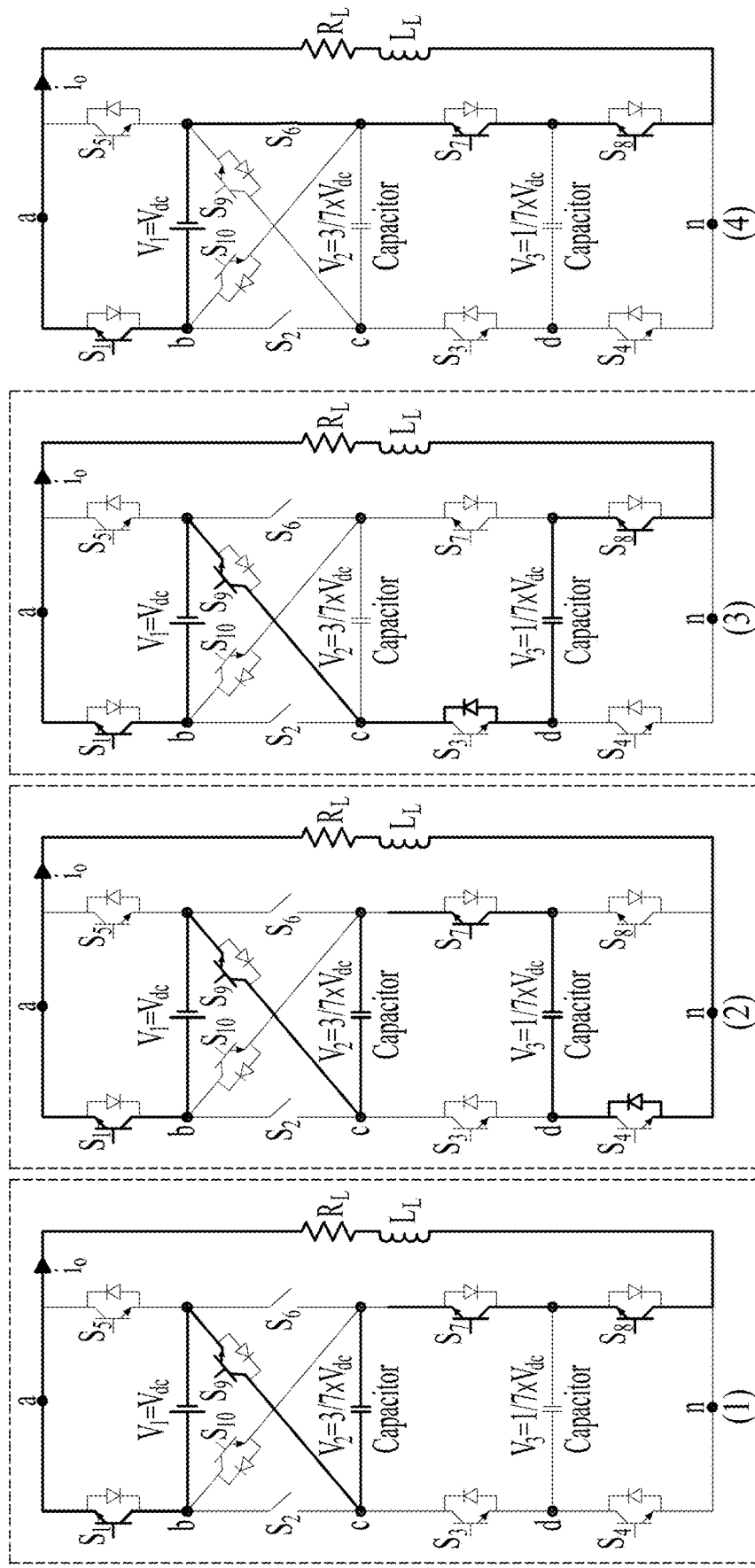
FIG. 21 presents various current paths of the hybrid UXU-CELL MLI or converter of FIGS. 19A to 19C, in accordance with associated switching states of FIG. 20, according to one embodiment.
Figure 21:
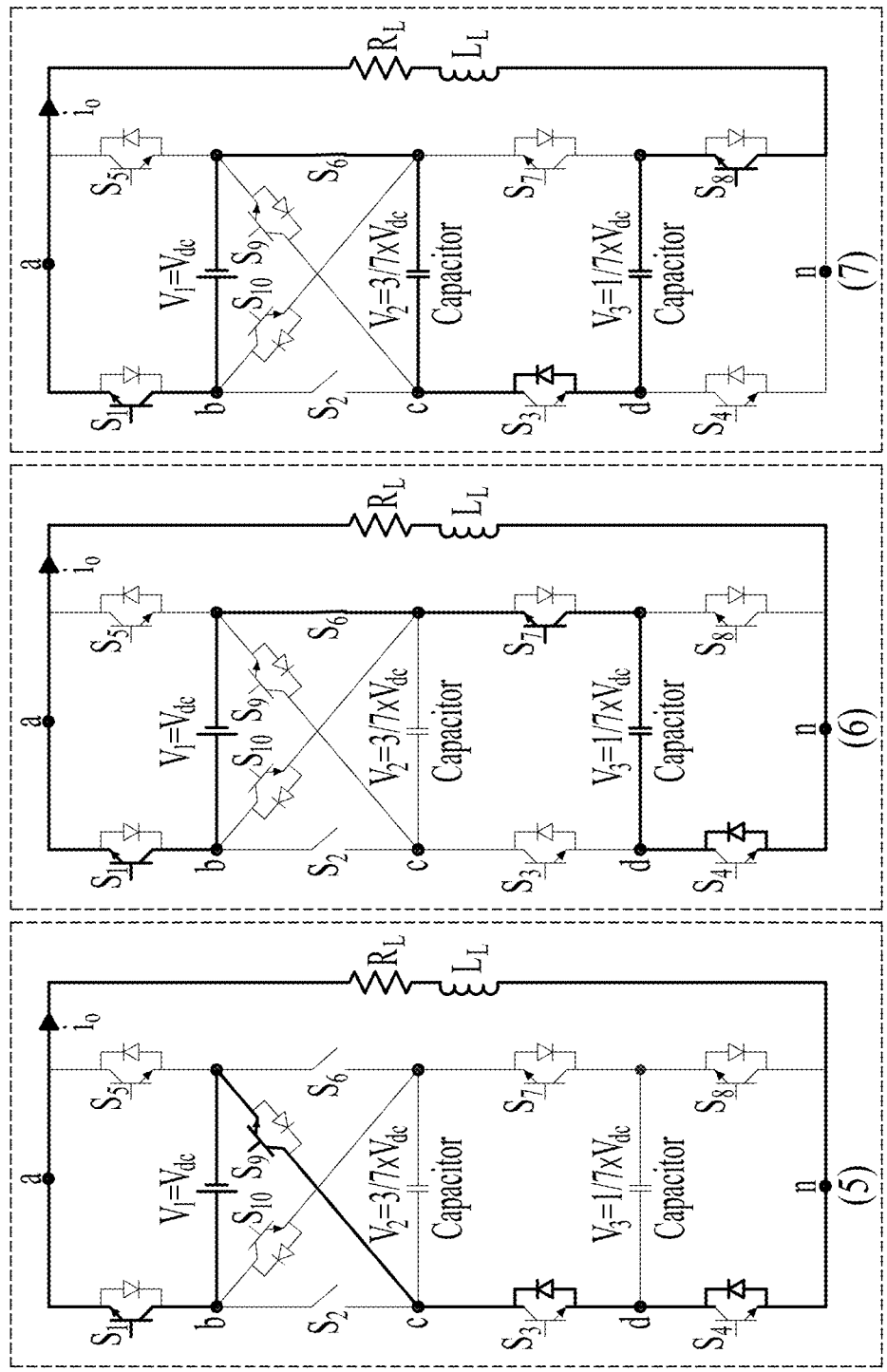
Figure 21:
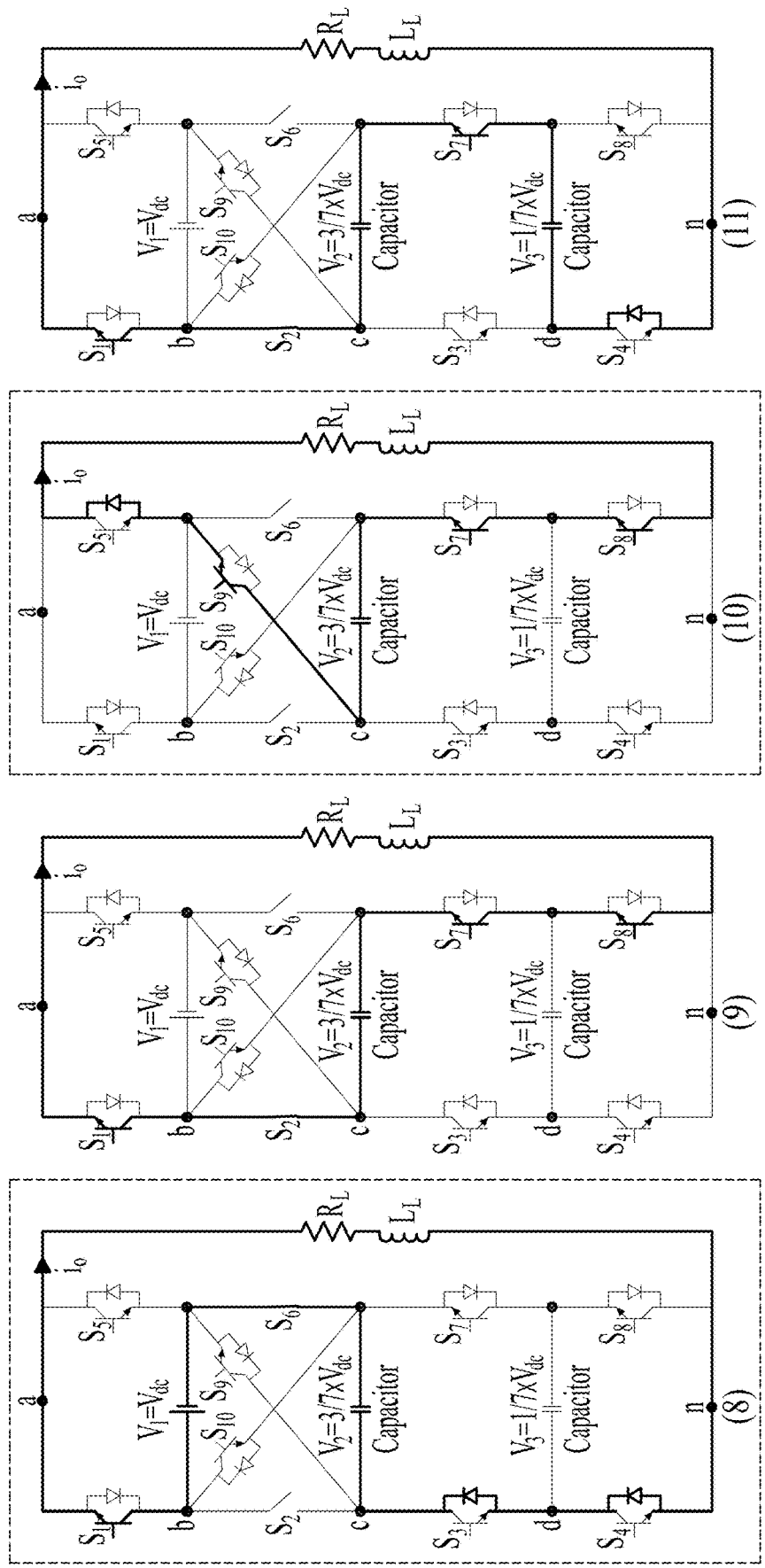
Figure 21:
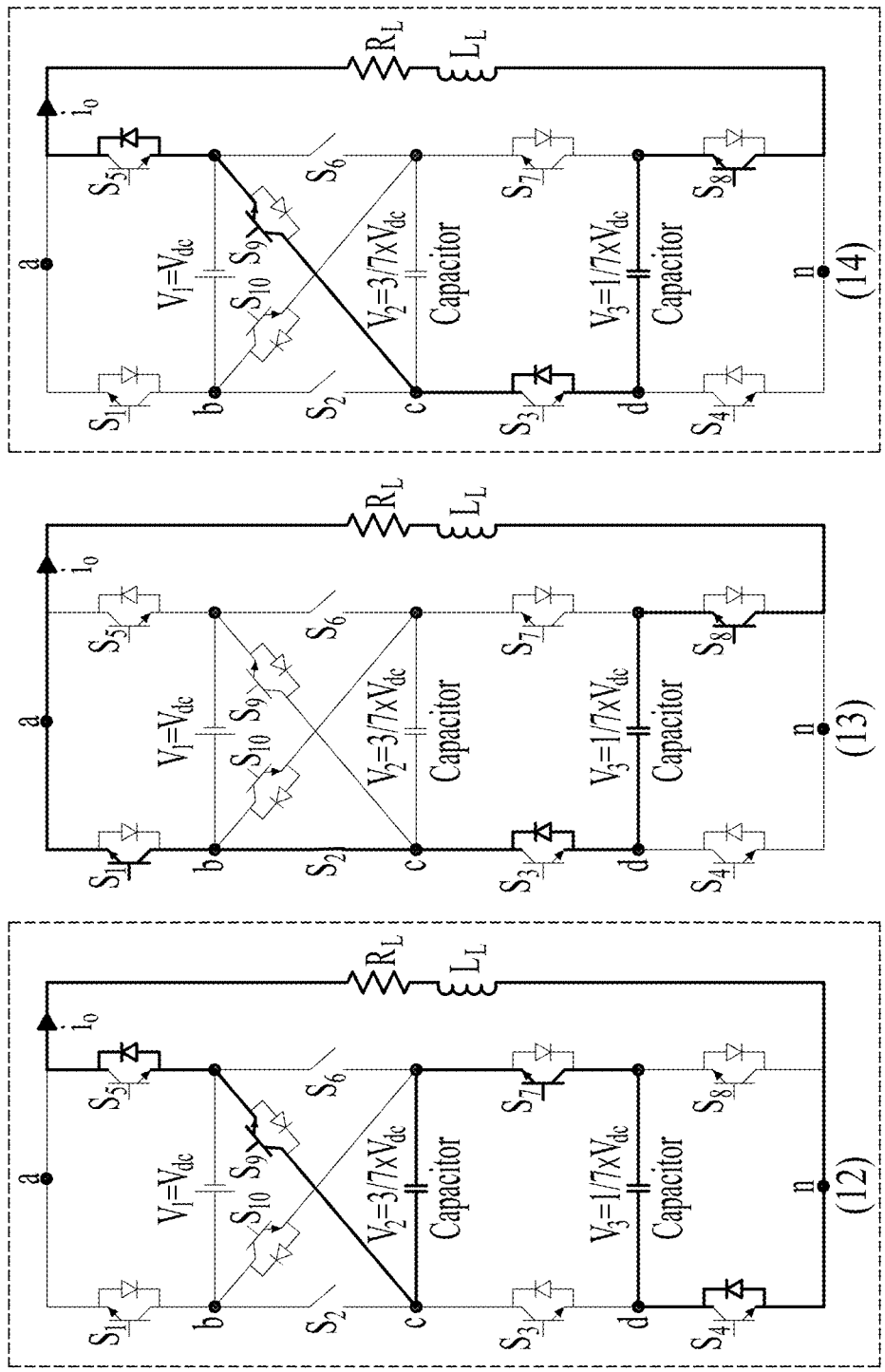
Figure 21:
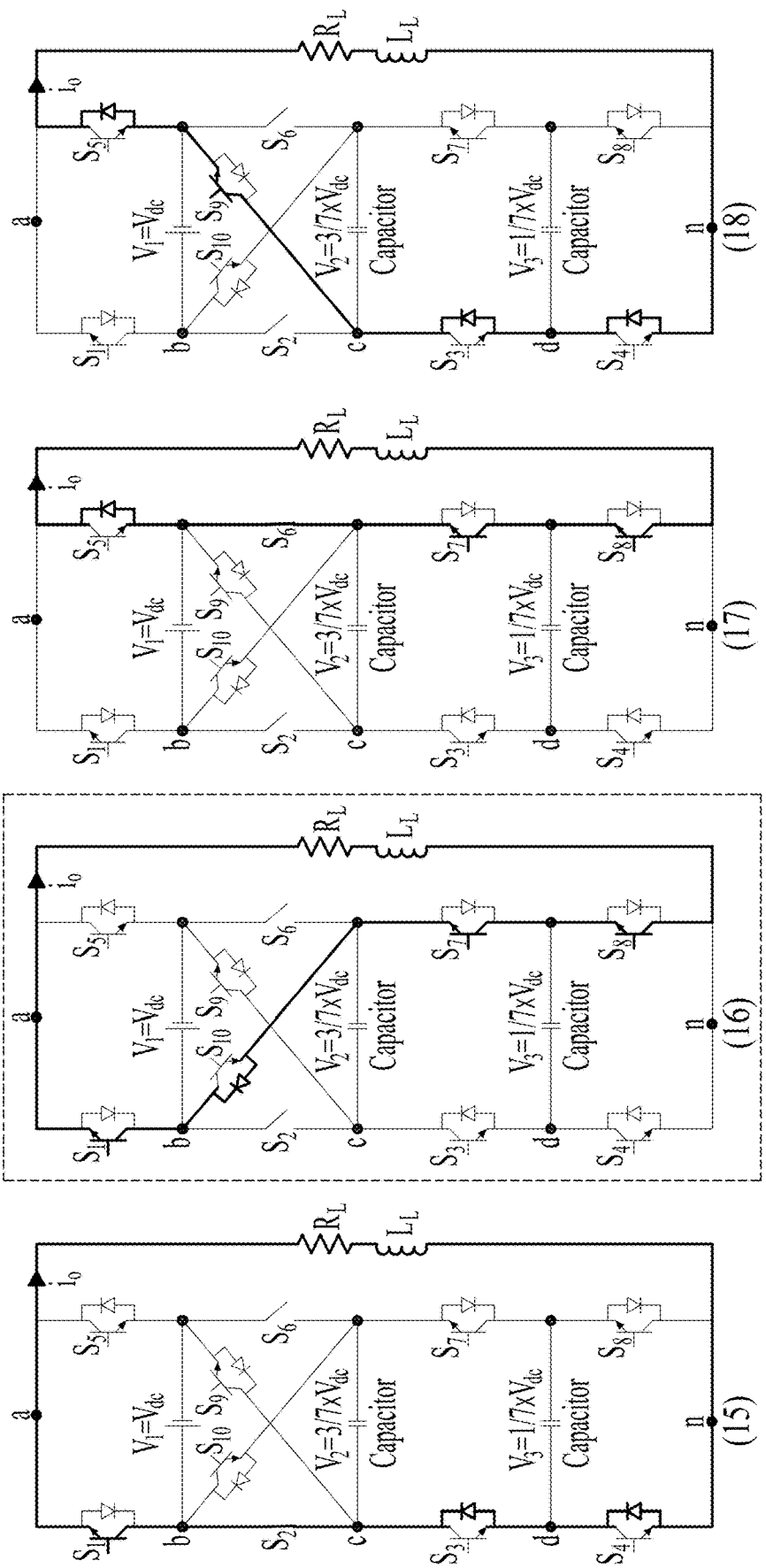
Figure 21:
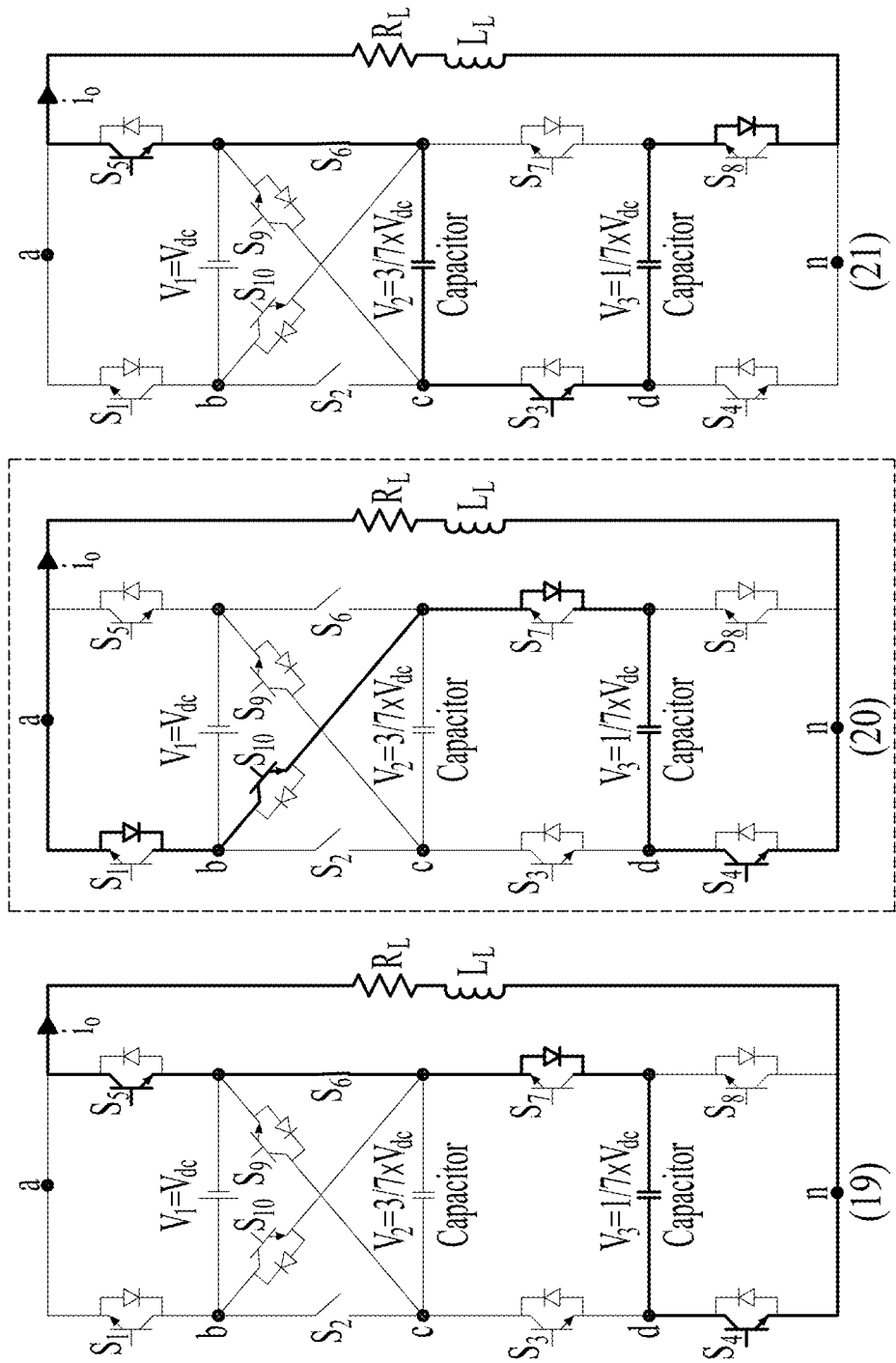
Figure 21:
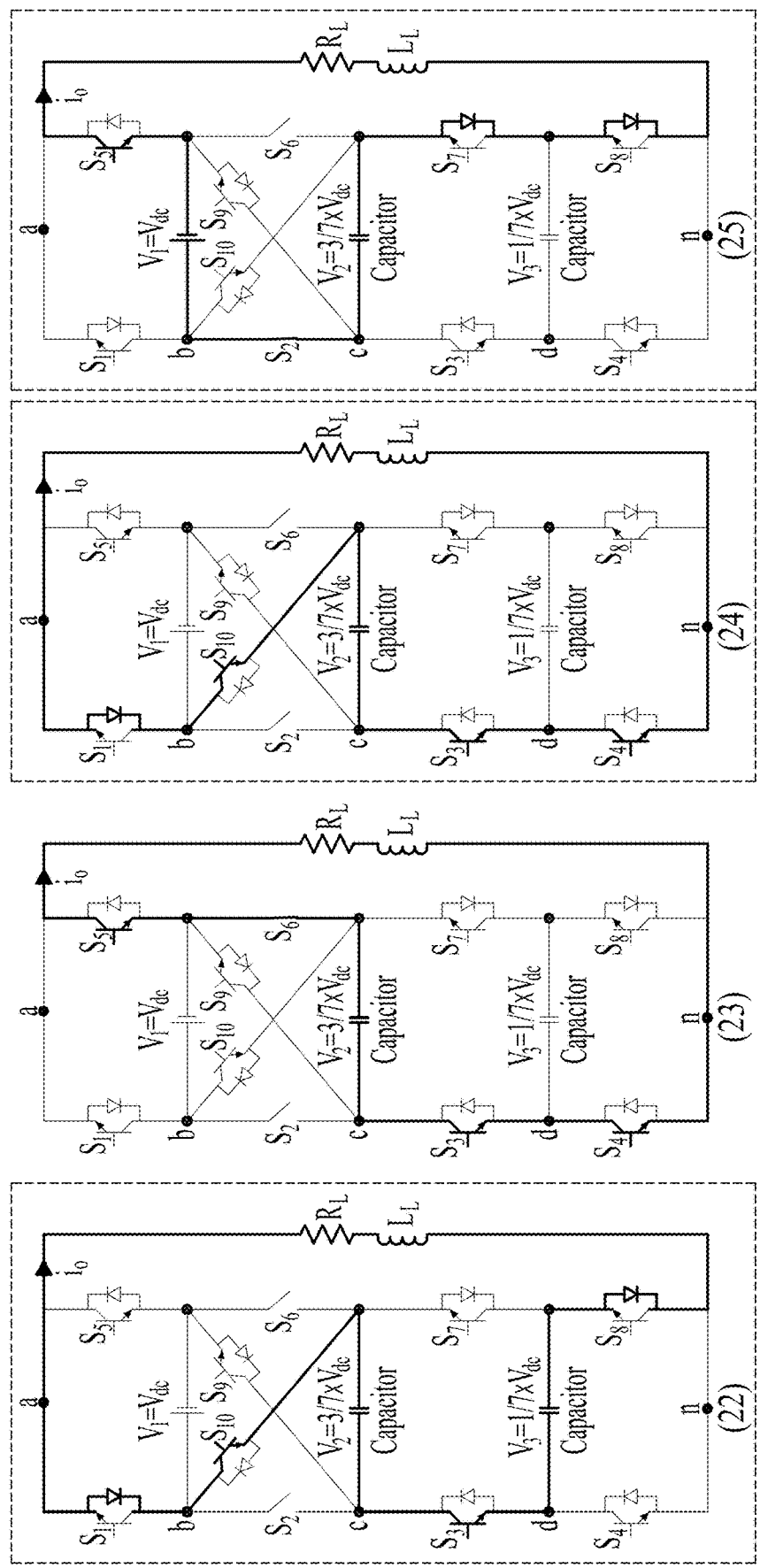
Figure 21:
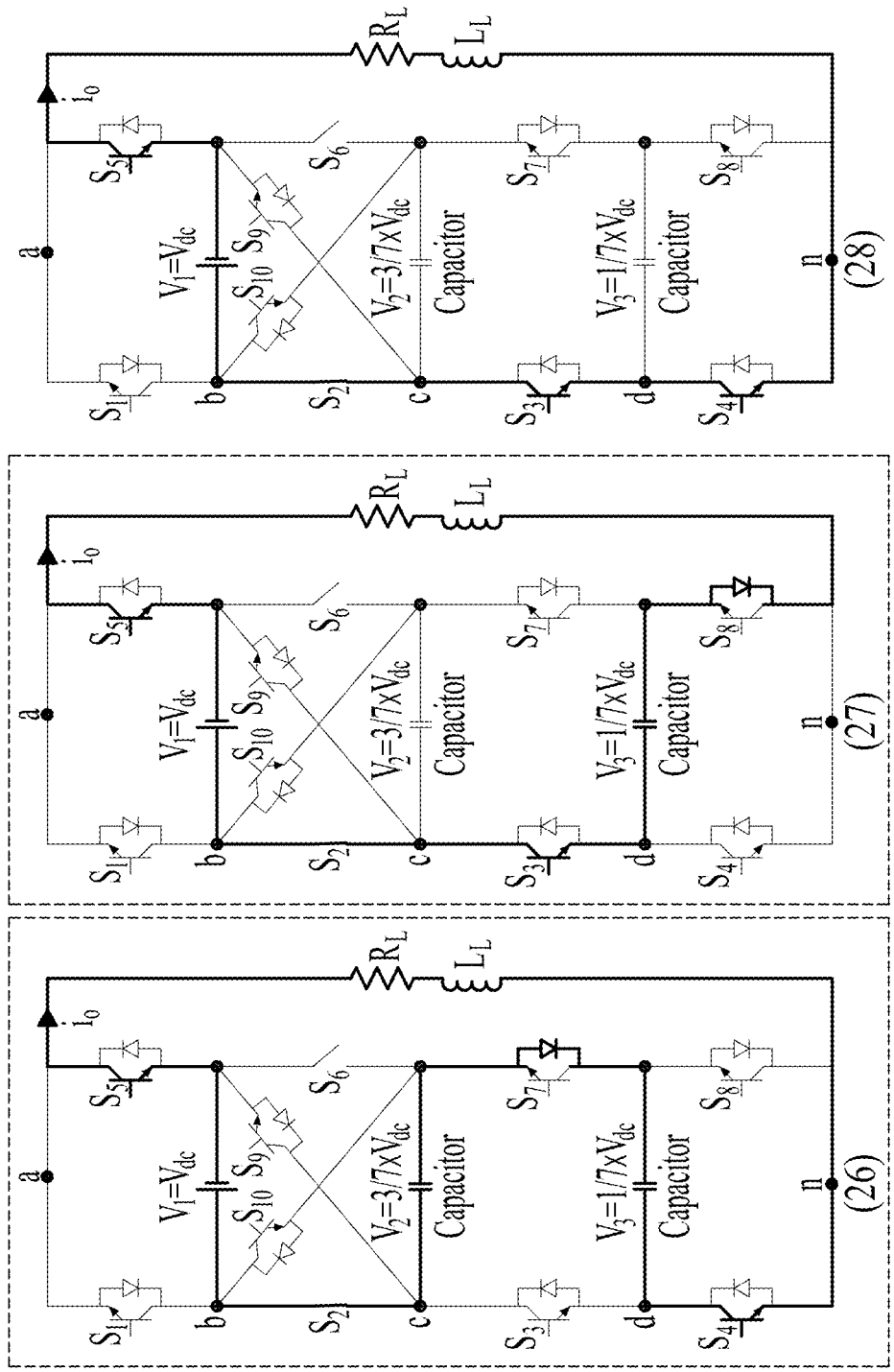
Figure 21:
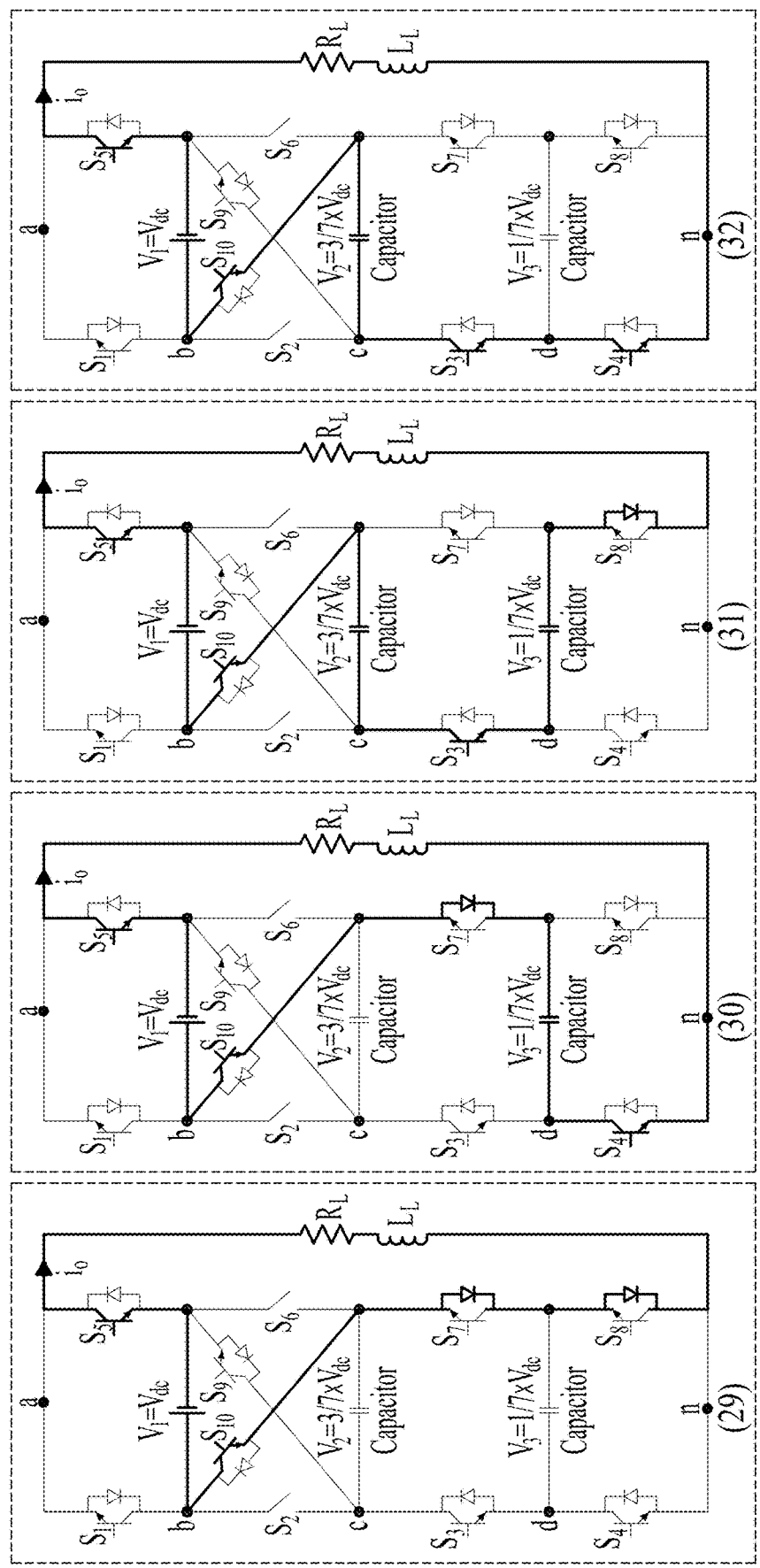
Figure 22:
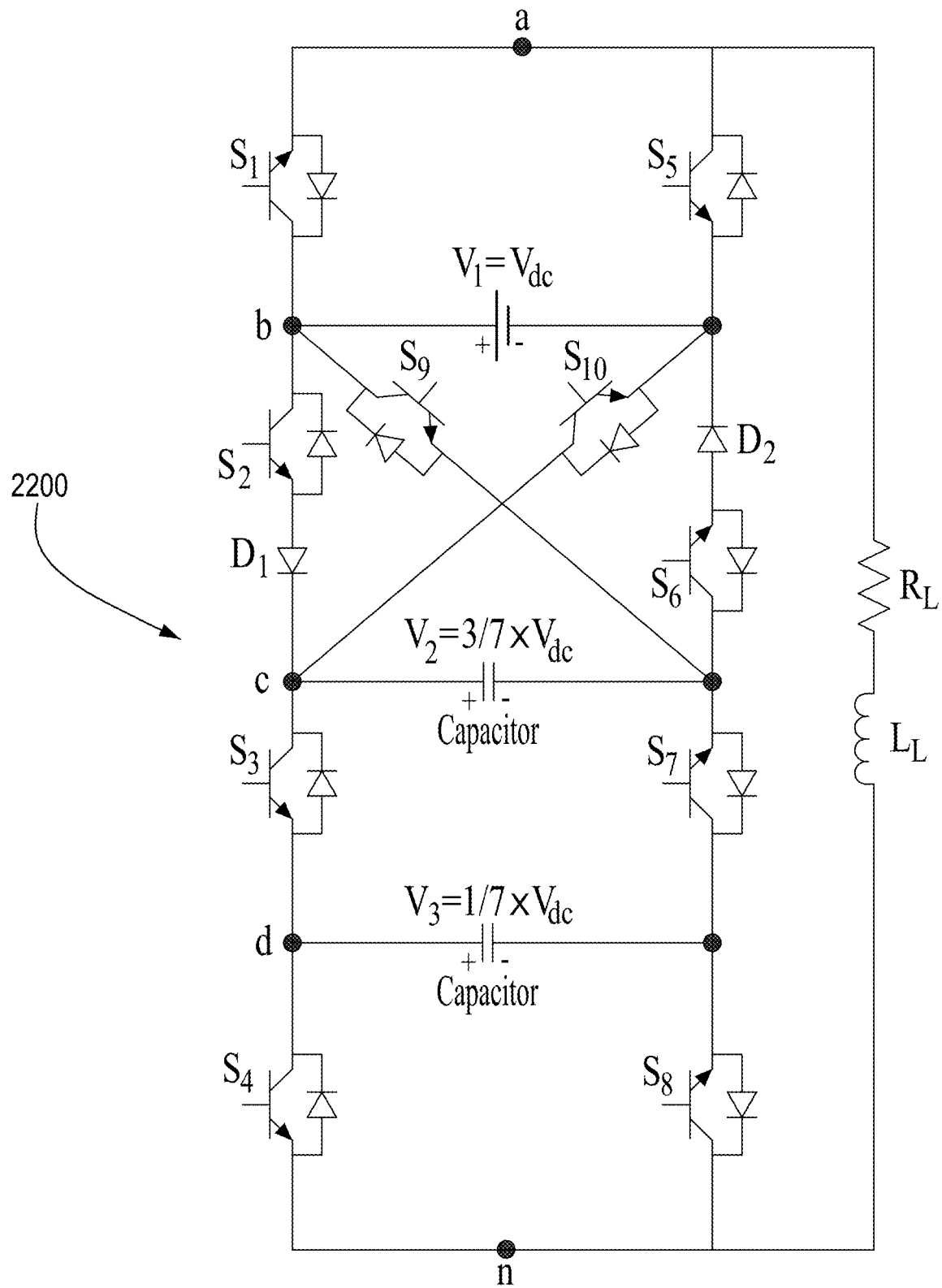
FIG. 22 presents an UXU-CELL MLI having unipolar devices and bipolar devices with unidirectional current flow capability, according to one embodiment.

By using the highlighted switching states in table 2000 of FIG. 20 or the selected current paths in FIG. 21, one can use unipolar devices and bipolar devices with unidirectional current flow capability instead of the bipolar devices with bi-directional current flow capability of FIGS. 19A, 19B, and 19C. As a result, six diodes can be omitted in the UXU-CELL MLI 1930 of FIG. 19C. FIG. 22 presents an alternate UX-CELL MLI 2200.

Simulation Results

Figure 23:
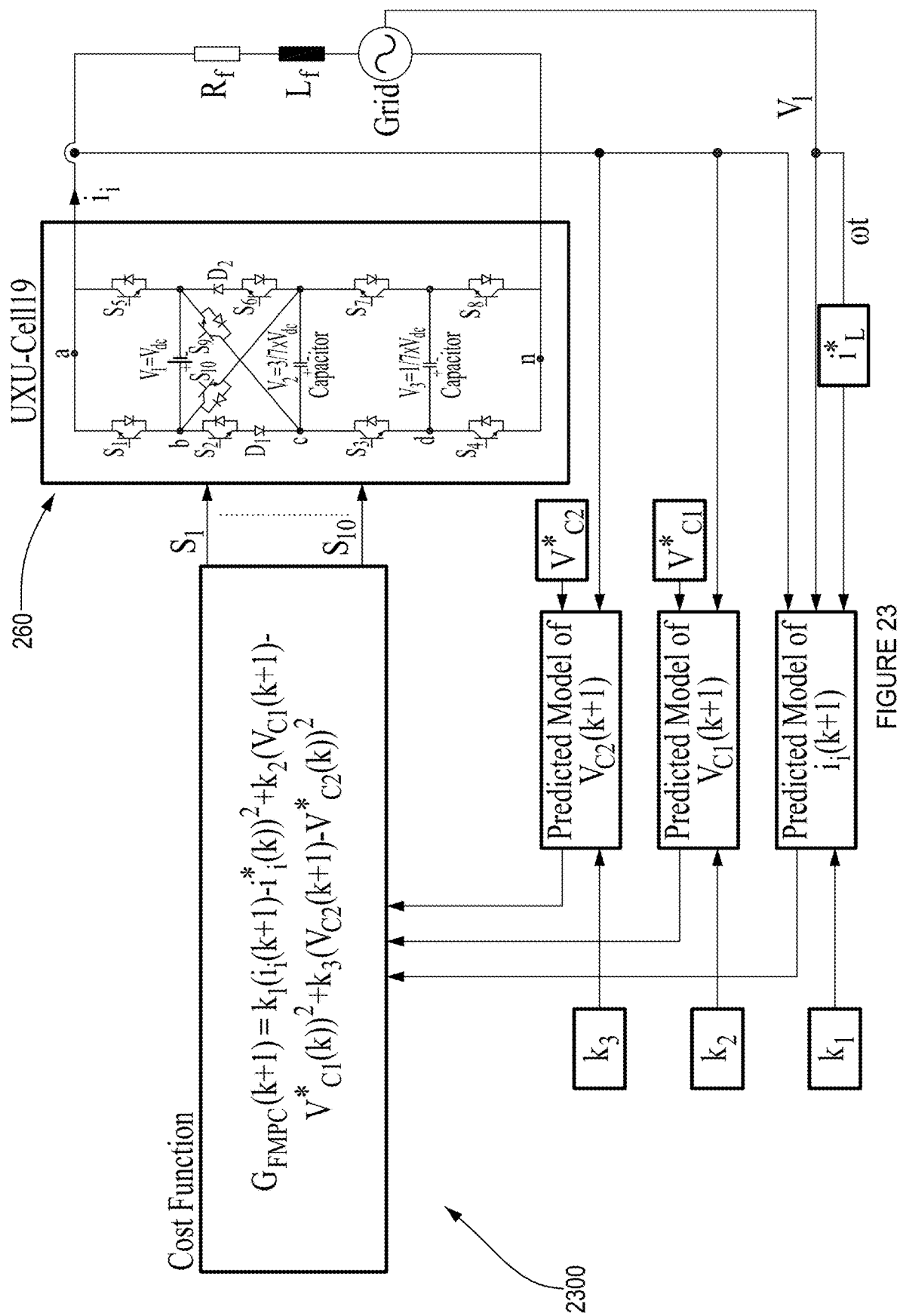
FIG. 23 presents a block diagram of a MPC adapted to operate the switches S1 to S8 of the UXU-CELL MLI or converter of FIG. 22 in grid-connected mode, according to one embodiment.
Figure 24:
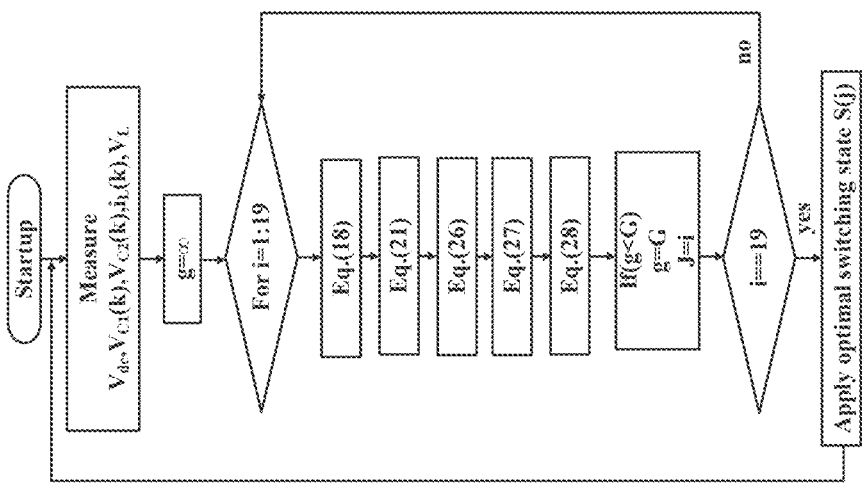
FIG. 24 presents a flowchart of the MPC operations of FIG. 23, according to one embodiment.

According to one embodiment and as presented in FIG. 23, there is provided a block diagram of an MPC controller 2300 adapted to operate the switches S1 to S8 of the UXU-CELL MLI 2200 of FIG. 22 in grid-connected mode of operation. FIG. 24 presents a flowchart of the MPC controller 2300 operations. The equations 16, 17, 18, 19, 22, and 23 depict the mathematical modeling of the proposed UXU-CELL MLI 2200 topology. Equations 20, 21, and 24 to 28 indicate the model predictive control that is designed for the UXU-CELL MLI 2200 topology.

$$S_i = \begin{cases} 0 \text{ if } S_i \text{ is off} \\ 1 \text{ if } S_i \text{ is off} \end{cases} \qquad (16)$$

$$\begin{cases} V_{ab} = -(1 - S_1) \times V_{dc} \\ V_{bc} = (1 - S_2) \times [-S_{10}V_{c1} - S_9 V_{dc} + S_6(V_{dc} - V_{c1})] \\ V_{cd} = (1 - S_3) \times (V_{c1} - V_{c2}) \\ V_{dn} = (1 - S_4) \times V_{c2} \end{cases} \qquad (17)$$

$$V_{an} = V_{ab} + V_{bc} + V_{cd} + V_{dn} \quad (18)$$

$$V_{an} = V_L + (i_L \times R_f) + \left(L_f \times \frac{di_L}{dt}\right) \quad (19)$$

$$\frac{di_L}{dt} \approx \frac{i_L(k+1) - i_L(k)}{T_s} \quad (20)$$

$$i_L(k+1) = \left(1 - \frac{R_f \times T_s}{L_f}\right) \times i_L(k) + \frac{T_s}{L_f} \times (V_{an}(k) - V_L(k)) \quad (21)$$

$$i_{c1} = C_1 \frac{dV_{C1}}{dt} = (S_3 - S_2 - S_9) \times i_L \quad (22)$$

$$i_{c2} = C_2 \frac{dV_{C2}}{dt} = (S_4 - S_3) \times i_L \quad (23)$$

$$\frac{dV_{C1}}{dt} \approx \frac{V_{C1}(k+1) - V_{C1}(k)}{T_s} \quad (24)$$

$$\frac{dV_{C2}}{dt} \approx \frac{V_{C2}(k+1) - V_{C2}(k)}{T_s} \quad (25)$$

$$V_{C1}(k+1) = \frac{(S_3 - S_2 - S_9)}{C_1} \times i_L(k) \times T_s + V_{C1}(k) \quad (26)$$

$$V_{C2}(k+1) = \frac{(S_4 - S_3)}{C_2} \times i_L(k) \times T_s + V_{C2}(k) \quad (27)$$

$$G = K_1 \times (i_L(k+1) - i_L(K+1)^*)^2 + \quad (28)$$
$$K_2 \times (V_{C1}(k+1) - V_{C1}(K+1)^*)^2 + K_3 \times (V_{C2}(k+1) - V_{C2}(K+1)^*)^2$$

Figure 26:
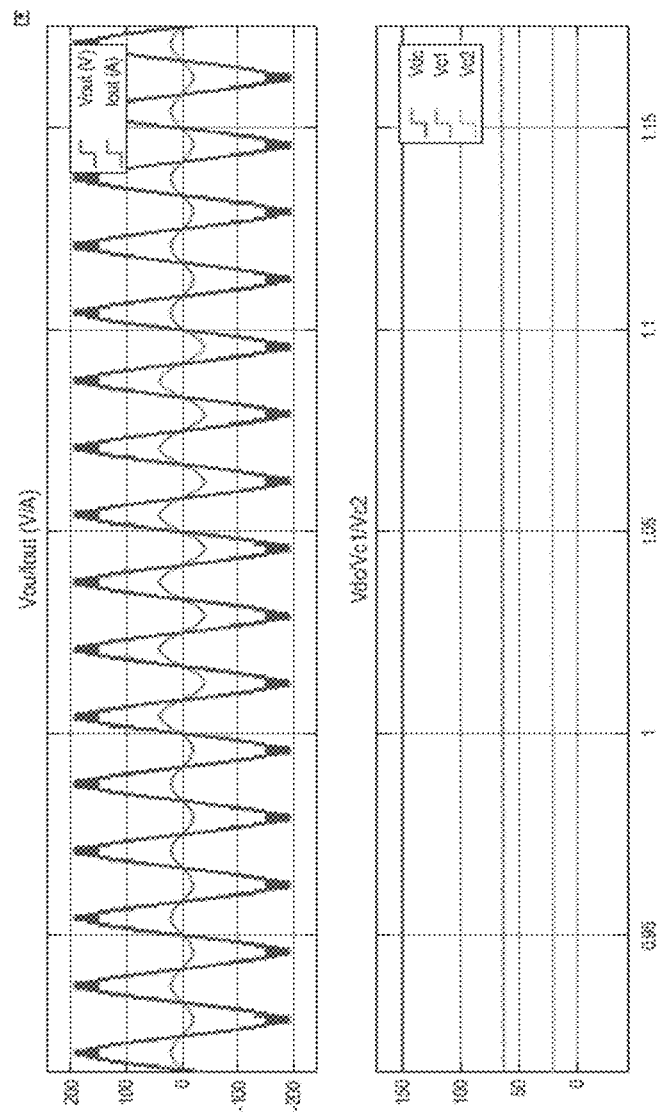
FIGS. 26 to 29 illustrate simulation results for output variables (i.e. output voltage, current and capacitors voltages) and THD analysis of the UXU-CELL MLI or converter of FIG. 22 in grid-connected mode before and after changing the reference current and DC link voltage respectively, according to one embodiment.
Figure 27:
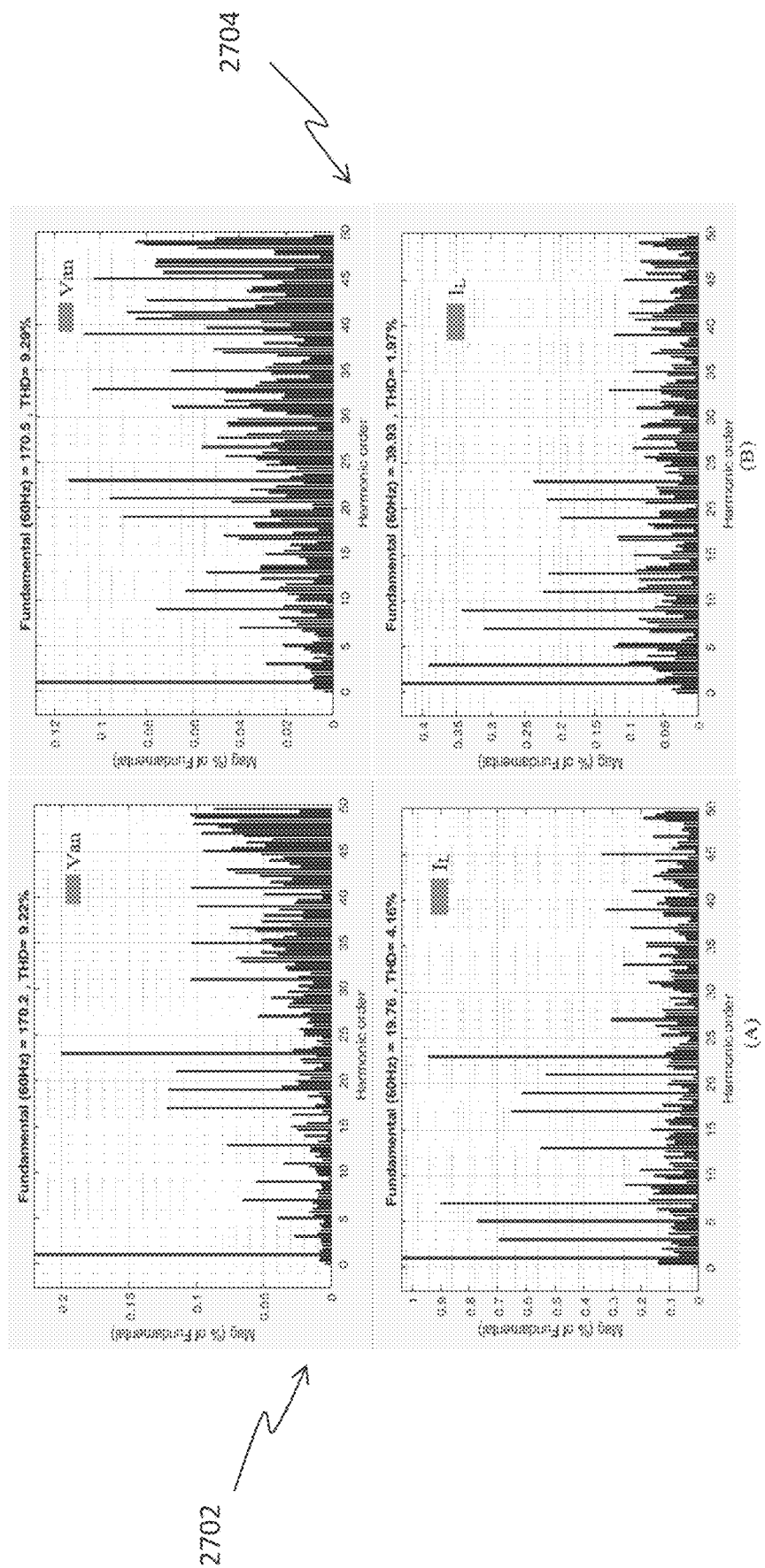
Figure 28:
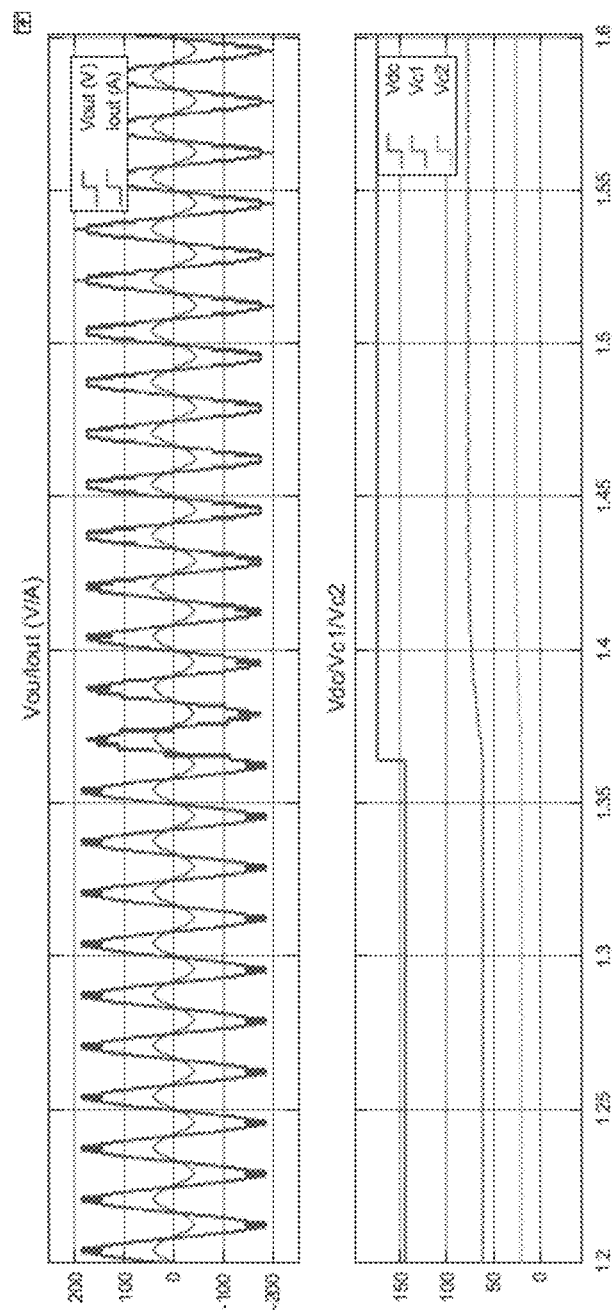
Figure 29:
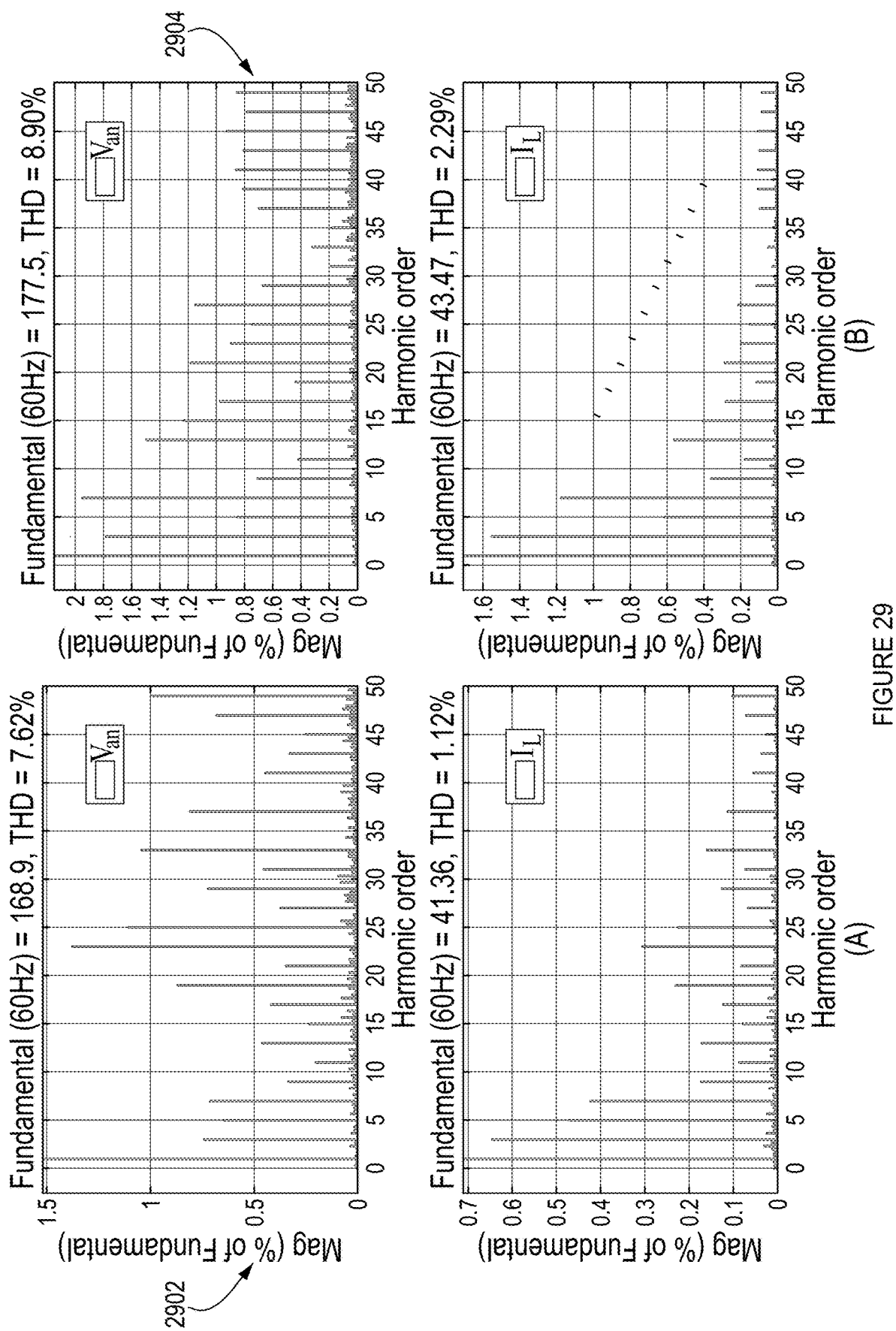

Simulation parameters listed in table 2500 of FIG. 25 are applied to the UXU-CELL MLI 2200. The simulation involves testing the dynamic of the UXU-CELL MLI 2200. Firstly, reference current is changed from 2 amps to 4 amps and is returned to 2 amps in grid-connected mode while Vdc=150V, then Vdc is increased from 145V to 175V in stand-alone mode of operation. FIGS. 26 and 28 illustrate output voltage ($V_{an}$ or Vo), output current ($I_L$ or $I_o$), and capacitors voltage ($V_{dc}$, $V_{c1}$, $V_{c2}$) of the proposed MLI 2200 during the dynamic test in order. Graph(A) 2702 of FIG. 27 indicates the THD of the output voltage and the output current when the reference current is equal to 2 amps and graph(B) 2704 of FIG. 27 presents the THD of the output voltage and the output current when reference current is equal to 4 amps. Graph(A) 2902 of FIG. 29 depicts the THD of the output voltage and the output current before increasing the dc link voltage in stand-alone mode of operation and Graph(B) 2904 of FIG. 29 depicts the THD of the output voltage and the output current after increasing the dc link voltage in stand-alone mode of operation.

Figure 8:
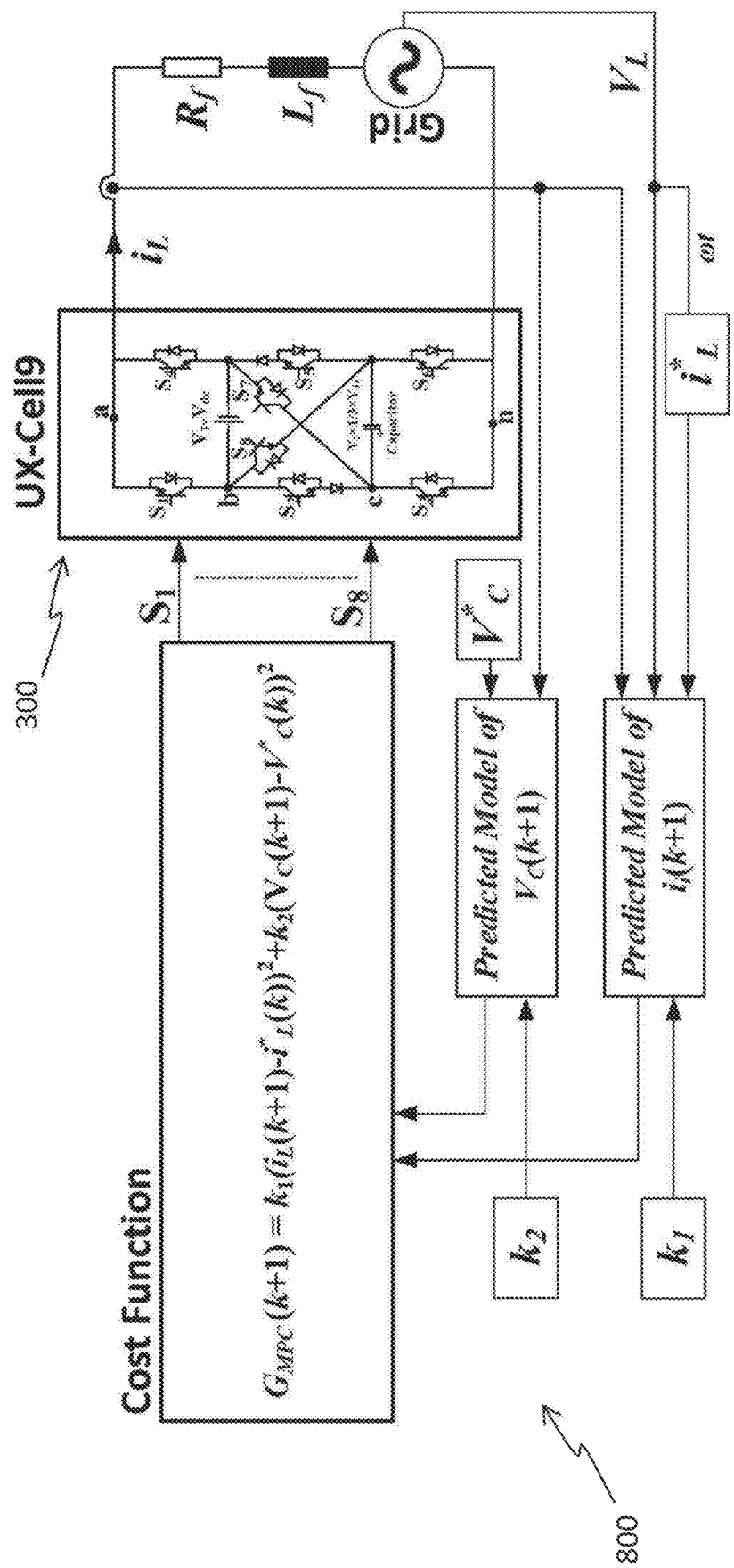
FIG. 8 presents a block diagram of a controller connected to the UX-CELL MLI of FIG. 3 and adapted to control the switches of the UX-CELL MLI according to a model predictive control (MPC) method, according to one embodiment.

A skilled person in the art will understand that the MPC controller 800 of FIG. 8 and the MPC controller 2300 of FIG. 23 can be replaced by any suitable controller for controlling the UX-CELL 300 or the UXU-CELL 1910, 1920, 1930, and 2200 without departing from the scope of the present solution.

Moreover, it shall be recognized that the UXU-CELL 1910, 1920, 1930, and 2200 can further be extended with additional U-CELLs 1800 and or UX-CELLs 510 to provide an even greater number of voltage levels, when controlled with an adapted controller such as with a suitable MPC controller.

In one embodiment, the controller (800 or 2300) adapted to control the plurality of switches of the multilevel power converter (UX-CELL MLI 300 or UXU-CELL 1910, 1920, 1930, and 2200) may comprise a measuring module (or unit), a switching state determination module (or unit), a cost function computing module (or unit), and a control signal output module (or unit) (none shown). The measuring unit may be configured for measuring the load current $i_L$ and the load voltage $V_L$ across the load, the source voltage $V_{dc}$ across the DC source of the power converter, and the capacitor voltage $V_c$ or $V_{C1}$, $V_{C2}$ across the at least one DC capacitor of the power converter. The switching state determination unit may be configured to determine possible switching states for the plurality of switches. The cost function computing unit may be configured to compute, for the possible switching states, a cost function based on the load current, the load voltage, the source voltage, and the capacitor voltage. In one embodiment, the cost function computation unit may be configured to compute a predicted load current for the load and a predicted capacitor voltage for the at least one capacitor, and to compute the cost function based on the predicted load current and the predicted capacitor voltage. The cost function computing unit may further be configured to select a given one of the switching states having a lowest cost function. The control signal output unit may then be configured to apply the given switching state to the power converter, i.e. to generate and issue (or output) a plurality of control signals to the plurality of switches in accordance with the given switching state.

In one embodiment, it can be seen that the proposed UX-Cell MLI topology may have the advantage of boosting ability of the DC link voltage, compared to other multilevel topologies, and a minimum manufacturing cost (since the proposed UX-Cell MLI makes use of eight switches and one capacitor only). In some embodiments, the proposed MLI topology may be useful for home and industrial applications, especially for single-phase single-dc-source converters of photovoltaic power system applications. By using this topology in photovoltaic power system applications, the need for a boost converter may be alleviated, which may decrease the application cost.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A multilevel power converter for transforming electrical power between direct current (DC) power and alternating current (AC) power, comprising:
   a first cell comprising a first switch, a second switch, and a DC source, the first switch and the second switch connectable to a load via a first terminal and connected in series with the source on opposite poles thereof;

a second cell comprising a third switch and a fourth switch, the third switch and the fourth switch connectable to the load via a second terminal and connected in series with a DC capacitor on opposite poles thereof; and at least one intermediate cell connecting the first cell to the second cell, the at least one intermediate cell comprising a fifth switch connected to a positive pole of the source and to a positive pole of the capacitor, a sixth switch connected to a negative pole of the source and to a negative pole of the capacitor, a seventh switch connected to the positive pole of the source and to the negative pole of the capacitor, and an eighth switch connected to the negative pole of the source and to the positive pole of the capacitor.

2. The power converter of claim 1, wherein the power converter is operated as an inverter and is configured for producing an AC output at the first and second terminals.

3. The power converter of claim 2, wherein the at least one intermediate cell comprises a single intermediate cell.

4. The power converter of claim 3, wherein the AC output has nine voltage levels.

5. The power converter of claim 3, further comprising an additional cell connecting the intermediate cell to the second cell, the third switch and the fourth switch of the second cell connected in series with an additional DC capacitor on opposite poles thereof, the additional cell comprising a first additional switch connected to the positive pole of the capacitor and to a positive pole of the additional capacitor, and a second additional switch connected to the negative pole of the capacitor and to a negative pole of the additional capacitor.

6. The power converter of claim 5, wherein the AC output has twenty-one voltage levels.

7. The power converter of claim 2, wherein the at least one intermediate cell comprises a plurality of interconnected intermediate cells.

8. The power converter of claim 7, wherein the AC output has $$\left[2 \times \sum_{m=1}^{\frac{N_{PSX}}{4}} (2^m - 1)\right] + 1$$

voltage levels, where $N_{PSX}$ is a total number of switches in the first cell, the second cell, and the plurality of intermediate cells.

9. The power converter of claim 1, wherein each of the first, second, third, fourth, seventh, and eighth switches is a unipolar switching device with bi-directional current flow capability.

10. The power converter of claim 9, wherein each of the fifth and sixth switches is a bipolar switching device with unidirectional current flow capability.

11. The power converter of claim 9, wherein each of the fifth and sixth switches comprises a unipolar switching device connected in series with a diode and having unidirectional current flow capability.

12. The power converter of claim 2, wherein the switches are operated with at least one redundant switching state to produce the AC output.

13. A method for controlling a multilevel power converter connected to a load, the method comprising:

measuring a load current and a load voltage across the load, a source voltage across a DC source of the power converter, and a capacitor voltage across at least one DC capacitor of the power converter;

determining possible switching states for a plurality of switches of the power converter, the plurality of switches comprising a first switch, a second switch, a third switch, a fourth switch, a fifth switch, a sixth switch, a seventh switch, and an eight switch, the first switch, the second switch, and the source forming a first cell of the power converter, the first switch and the second switch connected to the load via a first terminal and connected in series with the source on opposite poles thereof, the third switch and the fourth switch forming a second cell of the power converter, the third switch and the fourth switch connected to the load via a second terminal and connected in series with the at least one capacitor on opposite poles thereof, and the fifth switch, the sixth switch, the seventh switch, and the eight switch forming at least one intermediate cell of the power converter, the at least one intermediate cell connecting the first cell to the second cell, the fifth switch being connected to a positive pole of the source and to a positive pole of the at least one capacitor, the sixth switch being connected to a negative pole of the source and to a negative pole of the at least one capacitor, the seventh switch being connected to the positive pole of the source and to the negative pole of the at least one capacitor, and the eighth switch being connected to the negative pole of the source and to the positive pole of the at least one capacitor;

computing, for the possible switching states, a cost function based on the load current, the load voltage, the source voltage, and the capacitor voltage;

selecting a given one of the switching states having a lowest cost function; and applying the given switching state to the power converter.

14. The method of claim 13, wherein determining the possible switching states comprises applying a model predictive control technique.

15. The method of claim 13, further comprising computing a predicted load current for the load and a predicted capacitor voltage for the at least one capacitor, further wherein the cost function is computed based on the predicted load current and the predicted capacitor voltage.

16. The method of claim 13, wherein applying the given switching state to the power converter comprises:

generating a plurality of control signals for the plurality of switches in accordance with the given switching state; and issuing the plurality of control signals to the plurality of switches.

17. A controller for controlling a multilevel power converter connected to a load; the controller comprising:

a measuring unit configured to measure a load current and a load voltage across the load, a source voltage across a DC source of the power converter, and a capacitor voltage across at least one DC capacitor of the power converter;

a switching state determination unit configured to determine possible switching states for a plurality of switches of the power converter, the plurality of switches comprising a first switch, a second switch, a third switch, a fourth switch, a fifth switch, a sixth switch, a seventh switch, and an eight switch, the first switch, the second switch, and the source forming a first cell of the power converter, the first switch and the second switch connected to the load via a first terminal and connected in series with the source on opposite poles thereof, the third switch and the fourth switch forming a second cell of the power converter, the third switch and the fourth switch connected to the load via a second terminal and connected in series with the at least one capacitor on opposite poles thereof, and the fifth switch, the sixth switch, the seventh switch, and the eight switch forming at least one intermediate cell of the power converter, the at least one intermediate cell connecting the first cell to the second cell, the fifth switch being connected to a positive pole of the source and to a positive pole of the at least one capacitor, the sixth switch being connected to a negative pole of the source and to a negative pole of the at least one capacitor, the seventh switch being connected to the positive pole of the source and to the negative pole of the at least one capacitor, and the eighth switch being connected to the negative pole of the source and to the positive pole of the at least one capacitor;

a cost function computation unit configured to compute, for the possible switching states, a cost function based on the load current, the load voltage, the source voltage, and the capacitor voltage, and to select a given one of the switching states having a lowest cost function; and a control signal output unit configured to output, to the plurality of switches, a plurality of control signals in accordance with the given switching state.

18. The controller of claim 17, wherein the cost function computation unit is configured to compute a predicted load current for the load and a predicted capacitor voltage for the at least one capacitor, and to compute the cost function based on the predicted load current and the predicted capacitor voltage.

* * * * *